United States Patent
Lee et al.

(10) Patent No.: US 11,322,158 B2
(45) Date of Patent: May 3, 2022

(54) ELECTRONIC DEVICE AND COMMUNICATION CONNECTION METHOD USING VOICE THEREOF

(71) Applicant: Samsung Electronics Co., Ltd., Gyeonggi-do (KR)

(72) Inventors: Kiwan Lee, Gyeonggi-do (KR); Dohun Kim, Seoul (KR); Youngchan Cho, Gyeonggi-do (KR)

(73) Assignee: Samsung Electronics Co., Ltd

( * ) Notice: Subject to any disclaimer, the term of this patent is extended or adjusted under 35 U.S.C. 154(b) by 455 days.

(21) Appl. No.: 16/476,445

(22) PCT Filed: Dec. 27, 2017

(86) PCT No.: PCT/KR2017/015582
§ 371 (c)(1),
(2) Date: Jul. 8, 2019

(87) PCT Pub. No.: WO2018/128320
PCT Pub. Date: Jul. 12, 2018

(65) Prior Publication Data
US 2020/0058309 A1    Feb. 20, 2020

(30) Foreign Application Priority Data

Jan. 9, 2017    (KR) .................. 10-2017-0003134

(51) Int. Cl.
*G10L 17/00*    (2013.01)
*G10L 17/22*    (2013.01)
(Continued)

(52) U.S. Cl.
CPC .............. *G10L 17/22* (2013.01); *G10L 17/00* (2013.01); *G10L 17/02* (2013.01); *H04L 63/0861* (2013.01); *H04B 1/3827* (2013.01)

(58) Field of Classification Search
CPC ....... G10L 17/22; G10L 17/005; G10L 17/02; G06F 21/36; G06F 3/167; H04B 1/3827; H04L 63/0861; H04W 76/02
(Continued)

(56) References Cited

U.S. PATENT DOCUMENTS

| 2014/0012587 A1 | 1/2014 | Park |
| 2014/0046664 A1 | 2/2014 | Sarkar et al. |

(Continued)

FOREIGN PATENT DOCUMENTS

| EP | 3822831 A1 * | 5/2021 | ............. G06F 3/167 |
| KR | 101002905 | 12/2010 | |

(Continued)

OTHER PUBLICATIONS

PCT/ISA/210 Search Report issued on PCT/KR2017/015582, pp. 5.
PCT/ISA/237 Written Opinion issued on PCT/KR2017/015582, pp. 9.

*Primary Examiner* — Md S Elahee
(74) *Attorney, Agent, or Firm* — The Farrell Law Firm, P.C.

(57) ABSTRACT

An electronic device according to various embodiments of the present invention includes: a microphone; a communication module; a memory; and at least one processor, wherein the processor can receive and record a voice through the microphone while a function of receiving the voice is activated, generate first authentication data including data for the voice and identification data for the electronic device on the basis of the recorded voice, determine the mode of the electronic device on the basis of the recorded voice, send the first authentication data, receive second authentication data corresponding to the first authentication data, use identification data included in the second authentication data to connect communication with an external electronic device when the data for the voice included in (Continued)

the first authentication data matches data for voice included in the second authentication data, and perform, according to the mode, at least one function related to the communication-connected external electronic device and the voice. Various other embodiments are also possible.

14 Claims, 16 Drawing Sheets

(51) Int. Cl.
      *G10L 17/02*       (2013.01)
      *H04L 29/06*       (2006.01)
      *H04B 1/3827*     (2015.01)

(58) Field of Classification Search
      USPC .......................................................... 704/246
      See application file for complete search history.

(56) References Cited

U.S. PATENT DOCUMENTS

| | | | |
|---|---|---|---|
| 2014/0249817 A1 | 9/2014 | Hart et al. | |
| 2015/0154387 A1* | 6/2015 | Cockcroft | G06F 21/36 |
| | | | 726/6 |
| 2015/0223272 A1 | 8/2015 | Parkinson et al. | |
| 2017/0308693 A1 | 10/2017 | Cockcroft | |

FOREIGN PATENT DOCUMENTS

| | | |
|---|---|---|
| KR | 1020140005410 | 1/2014 |
| KR | 1020150050099 | 5/2015 |
| KR | 1020160092017 | 8/2016 |
| KR | 1020160115951 | 10/2016 |
| KR | 1020160130609 | 11/2016 |

\* cited by examiner

ELECTRONIC DEVICE AND COMMUNICATION CONNECTION METHOD USING VOICE THEREOF

PRIORITY

This application is a National Phase Entry of PCT International Application No. PCT/KR2017/015582 which was filed on Dec. 27, 2017, and claims priority to Korean Patent Application No. 10-2017-0003134, which was filed on Jan. 9, 2017, the content of each of which is incorporated herein by reference.

TECHNICAL FIELD

Various embodiments of the disclosure relate to an electronic device and communication connection method using a voice and, for example, to an electronic device and method capable of performing communication connection between electronic devices by using a user voice.

BACKGROUND ART

With the recent development of technologies, a variety of electronic devices capable of wireless communication and personal information processing, such as a smart phone, a tablet personal computer (PC), and a personal digital assistant (PDA), have been launched and popularized. In addition, various wireless communication technologies capable of providing an interworking service between electronic devices have been developed and applied. For example, wireless communication technologies such as wireless fidelity (WiFi), Bluetooth, and Zigbee have been developed and applied in order to support an interworking service between electronic devices.

DISCLOSURE OF INVENTION

Technical Problem

Generally, in order to communicate with other electronic devices through wireless communication technologies, an electronic device is required to perform a complicated process such as searching for, selecting, authenticating, and connecting a peripheral device that supports the wireless communication technologies. For example, in order to establish a communication connection between electronic devices that recognize a device address each other, one of them is operated as a master device, and the other is operated as a slave device and requests a communication connection to the master device. Here, the master device may refer to a device that plays a main role in performing a function, and is able to control and command the slave device. The slave device may refer to a device that plays a dependent role in performing a function, and is able to perform a function in accordance with instructions of the master device. The master device that receives a connection request performs an authentication procedure to determine whether a connection-requesting device is a slave device that the master device desires to connect. If the connection-requesting device is authenticated as the slave device, the master device performs a communication connection with the slave device. As such, when a user desires to use a communication connection function between electronic devices, the communication connection requires many user interactions and a complicated process. This causes a problem of lowing user convenience.

Solution to Problem

An electronic device according to various embodiments of the disclosure may include a microphone; a communication module; a memory; and at least one processor, wherein the processor is configured to receive and record a voice through the microphone while a function of receiving the voice is activated, to generate first authentication data including data on the voice and identification data on the electronic device, based on the recorded voice, to determine a mode of the electronic device, based on the recorded voice, to transmit the first authentication data, to receive second authentication data corresponding to the first authentication data, to connect communication with an external electronic device by using identification data included in the second authentication data when data on a voice included in the second authentication data is identical to the data on the voice included in the first authentication data, and to perform at least one function related to the voice with the communication-connected external electronic device according to the mode.

An electronic device according to various embodiments of the disclosure may include a communication module; a memory; and at least one processor, wherein the processor is configured to receive a recorded voice from a first external electronic device communication-connected through the communication module, to generate first authentication data including data on the voice and identification data on the electronic device, based on the recorded voice, to determine a mode of the electronic device, based on the recorded voice, to transmit the first authentication data, to receive second authentication data corresponding to the first authentication data, to connect communication with a second external electronic device by using identification data included in the second authentication data when data on a voice included in the second authentication data is identical to the data on the voice included in the first authentication data, and to perform at least one function related to the recorded voice with the communication-connected second external electronic device according to the mode.

A communication connection method of an electronic device using a voice according to various embodiments of the disclosure may include operations of receiving and recording a voice through a microphone while a function of receiving the voice is activated; generating first authentication data including data on the voice and identification data on the electronic device, based on the recorded voice; determining a mode of the electronic device, based on the recorded voice; transmitting the first authentication data; receiving second authentication data corresponding to the first authentication data; connecting communication with an external electronic device by using identification data included in the second authentication data when data on a voice included in the second authentication data is identical to the data on the voice included in the first authentication data; and performing at least one function related to the voice with the communication-connected external electronic device according to the mode.

Advantageous Effects of Invention

According to various embodiments of the disclosure, a communication connection method and device using a voice can be provided to simplify a process for a communication connection between electronic devices using a voice.

According to various embodiments of the disclosure, a communication connection method and device using a voice can be provided to automatically determine operation modes of electronic devices, based on a voice inputted to the electronic devices, and to enable the communication-connected electronic devices to perform a function after a communication connection corresponding to a voice according to each operation mode.

MODE FOR THE INVENTION

Figure 1:
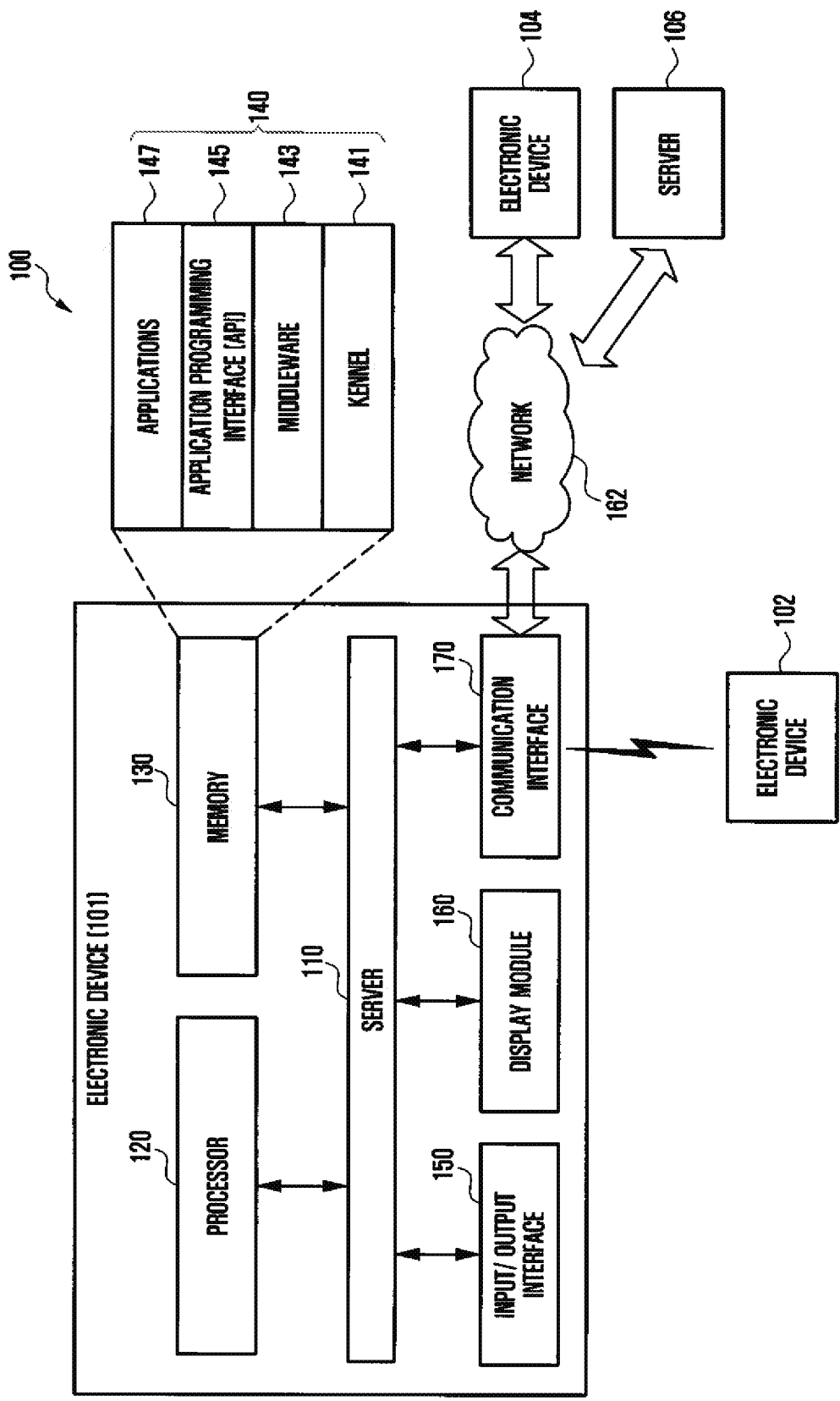
FIG. 1 is a block diagram illustrating a network environment including an electronic device according to various embodiments of the disclosure.

Hereinafter, various embodiments of the present disclosure are described in detail with reference to accompanying drawings. The embodiments and terms used herein are not intended to limit the technology disclosed in specific forms and should be understood to include various modifications, equivalents, and/or alternatives to corresponding embodiments. In the drawings, similar reference numbers are used to indicate similar constituent elements. As used herein, singular forms are intended to include the plural forms as well, unless the context clearly indicates otherwise. In the present disclosure, the expression "A or B" or "at least one of A and/or B" is intended to include any possible combination of enumerated items. In the present disclosure, expressions such as "1st" or "first", "2nd" or "second", etc. may modify various components regardless of the order and/or the importance but do not limit corresponding components. When it is mentioned that a (first) component is "connected" to or "accessed" by another (second) component, it may be understood that the component is directly connected to or accessed by the other component or that still other (third) component is interposed between the two components.

In the present disclosure, the expression "configured to ~" may be interchangeably used with the expressions "suitable for ~", "having a capability of ~", "changed to ~", "made to ~", "capable of ~", and "designed for" in hardware or software. The expression "device configured to ~" may denote that the device is "capable of ~" with other devices or components. For example, a "processor configured to (or set to) perform A, B, and C" may mean a dedicated processor (e.g., an embedded processor) for performing a corresponding operation or a general-purpose processor (e.g., a central processing unit (CPU) or an application processor (AP)) which executes corresponding operations by executing one or more software programs which are stored in a memory device.

According to various embodiments of the present disclosure, an electronic device may include at least one of a smart phone, a tablet Personal Computer (PC), a mobile phone, a video phone, an e-book reader, a desktop PC, a laptop PC, a netbook computer, a workstation, a server, a personal digital assistant (PDA), a portable multimedia player (PMP), an MP3 player, a medical device, a camera, and a wearable device. The wearable device may include at least one of an appcessory type device (e.g. a watch, a ring, a bracelet, an anklet, a necklace, glasses, contact lens, and head-mounted-device (HMD), a textile or clothes-integrated device (e.g., electronic clothes), a body-attached device (e.g., skin pad and tattoo), and a bio-implemented circuit. According to various embodiments, the electronic device may include at least one of television (TV), a digital video disk (DVD) player, an audio player, an air conditioner, a cleaner, an oven, a microwave oven, a washing machine, an air cleaner, a set-top box, a home automation control panel, a security control panel, a media box (for example, Samsung HomeSync™, Apple TV™, or Google TV™), game consoles (for example, Xbox™, PlayStation™), an electronic dictionary, an electronic key, a camcorder, and an electronic frame.

According to an alternative embodiment, the electronic device may include at least one of a medical device (such as portable medical measuring devices (including a glucometer, a heart rate monitor, a blood pressure monitor, and a body temperature thermometer), a magnetic resonance angiography (MRA) device, a magnetic resonance imaging (MRI) device, a computed tomography (CT) device, a camcorder, and a microwave scanner), a navigation device, a global navigation satellite system (GNSS), an event data recorder (EDR), a flight data recorder (FDR), an automotive infotainment device, marine electronic equipment (such as marine navigation system and gyro compass), aviation electronics (avionics), security equipment, an automotive head unit, an industrial or household robot, a drone, an automatic teller machine (ATM), a point of sales (POS) terminal, and an Internet-of-things (IoT) device (such as electric bulb, sensor, sprinkler system, fire alarm system, temperature controller, street lamp, toaster, fitness equipment, hot water tank, heater, and boiler). According to an embodiment of the present disclosure, the electronic device may include at least one of furniture, a part of a building/structure, a part of a vehicle, an electronic board, an electronic signature receiving device, a projector, and a sensor (such as water, electricity, gas, and electric wave meters). According to various embodiments of the present disclosure, the electronic device may be flexible or a combination of at least two of the aforementioned devices. According to an embodiment of the present disclosure, the electronic device is not limited to the aforementioned devices. In the present disclosure, the term "user" may denote a person who uses the electronic device or a device (e.g., artificial intelligent electronic device) which uses the electronic device.

A description is made of the electronic device 101 in a network environment 100 with reference to FIG. 1. The electronic device 101 may include a bus 110, a processor 120, a memory 130, an input/output interface 150, a display 160, and a communication interface 170. In an embodiment, the electronic device 101 may be configured without at least one of the aforementioned components or with another component. The bus 110 may include a circuit for interconnecting components 110 to 170 such that the components communicate signal (e.g., control message and data). The processor 120 may include at least one of a central processing device, an application processor, and a communication processor (CP). The processor 120 may execute operation related to the control of and/or communication among the other components constituting the electronic device 101 and perform data processing.

The memory 130 may include a volatile and/or non-volatile memory. The memory 130 may store a command or data associated with at least one of the components of the electronic device 101. According to an embodiment, the memory 130 may store software and/or programs 140. The programs 140 may include a kernel 141, a middleware 143, an application programming interface (API) 145, and/or an application program (or "application") 147. At least part of the kernel 141, middleware, and API 145 may be referred to as operating system. The kernel 141 may control or manage system resources (e.g., bus 110, processor 120, and memory 130) for use in executing operations or functions implemented in other programming modules (e.g., middleware 143, API 145, and application program 147). Further, the kernel 141 can provide an interface through which the middleware 143, the API 145, and/or the application 147 can access an individual element of the electronic device 101 and then control and/or manage system resources.

The middleware 143 may relay the data communicated between the API 145 or the application program 147 and the kernel 141. The middleware 143 may process at least one task request received from the application program 147 according to priority. For example, the middleware 143 may assign a priority to at least one of the application programs 147 for use of the system resources (e.g., the bus 110, the processor 120, and the memory 130) of the electronic device 101 and process the at least one task request according to the assigned priority. The API 145 may include an interface for controlling the functions provided by the kernel 141 and the middle 143 and includes at least one interface or function (e.g., command) for file control, window control, and video control, and text control, by way of example. The input/output interface 150 may relay a command or data input by a user or via an external electronic device to other component(s) of the electronic device 101 and output a command or data received from other component(s) of the electronic device 101 to the user or the external electronic device.

Examples of the display 160 may include a liquid crystal display (LCD), a light emitting diodes display (LED), a organic LED (OLED) display, a micro electro mechanical systems (MEMS) display, and an electronic paper display. The display 160 may display various contents (e.g., text, image, video, icon, and symbol) to the user by way of example. The display 160 may include a touch screen that is capable of receiving a touch, gesture, proximity, or hovering input made with an electronic pen or part of the user's body by way of example.

The communication interface 170 may set up a communication channel between the electronic device 101 and an external device (e.g., first external electronic device 102, second external electronic device 104, and server 106). For example, the communication interface 170 may connect to the network 162 through a wireless or wired communication channel to communicate with the external electronic device (e.g., second external electronic device 104 and server 106).

Examples of the wireless communication may include cellular communications using at least one of LTE, LTE Advanced (LTE-A), code division multiple access (CDMA), wideband CDMA (WCDMA), universal mobile telecommunications system (UMTS), Wireless Broadband (WiBro), and global system for mobile communications (GSM). According to an embodiment, examples of the wireless communication may include communications using at least one of wireless fidelity (Wi-Fi), Bluetooth, Bluetooth low energy (BLE), Zigbee, near field communication (NFC), magnetic secure transmission, radio frequency (RF), and body area network (BAN). According to an embodiment, examples of the wireless communication may include GNSS communication. Examples of the GNSS may include a global positioning system (GPS), a global navigation satellite system (Glonass), a Beidou navigation satellite system (hereinafter, referred to as "Beidou"), and Galileo (the European global satellite-based navigation system). In the following description, the terms "GPS" and "GNSS" are interchangeably used. Examples of the wired communication may include communications using at least one of universal serial bus (USB), high definition multimedia interface (HDMI), recommended standard 233 (RS-232), power line communication, and plain old telephone service (POTS). The network 162 may be a telecommunication network including a computer network (e.g., LAN and WAN), Internet, and telephony network, by way of example.

Each of the first and second external electronic devices 102 and 104 may be identical to or different from the electronic device 101 in type. According to various embodiments, all or part of the operations being executed at the electronic device 101 may be executed at one or more other electronic devices (e.g., electronic devices 102 and 104 and server 106). According to an embodiment, if it is necessary for the electronic device 101 to execute a function or service automatically or in response to a request, the electronic device 101 may request to another device (e.g., electronic devices 102 and 104 and server 106) for executing at least part of related functions on its behalf or additionally. The other electronic device (e.g., electronic devices 102 and 104 and server 106) may execute the requested function or additional function and notify the electronic device 101 of the execution result. The electronic device 101 may provide the requested function or service with execution result in itself or after performing additional processing thereon. In order to accomplish this, it may be possible to use a cloud computing, a distributed computing, or a client-server computing technology.

Figure 2:
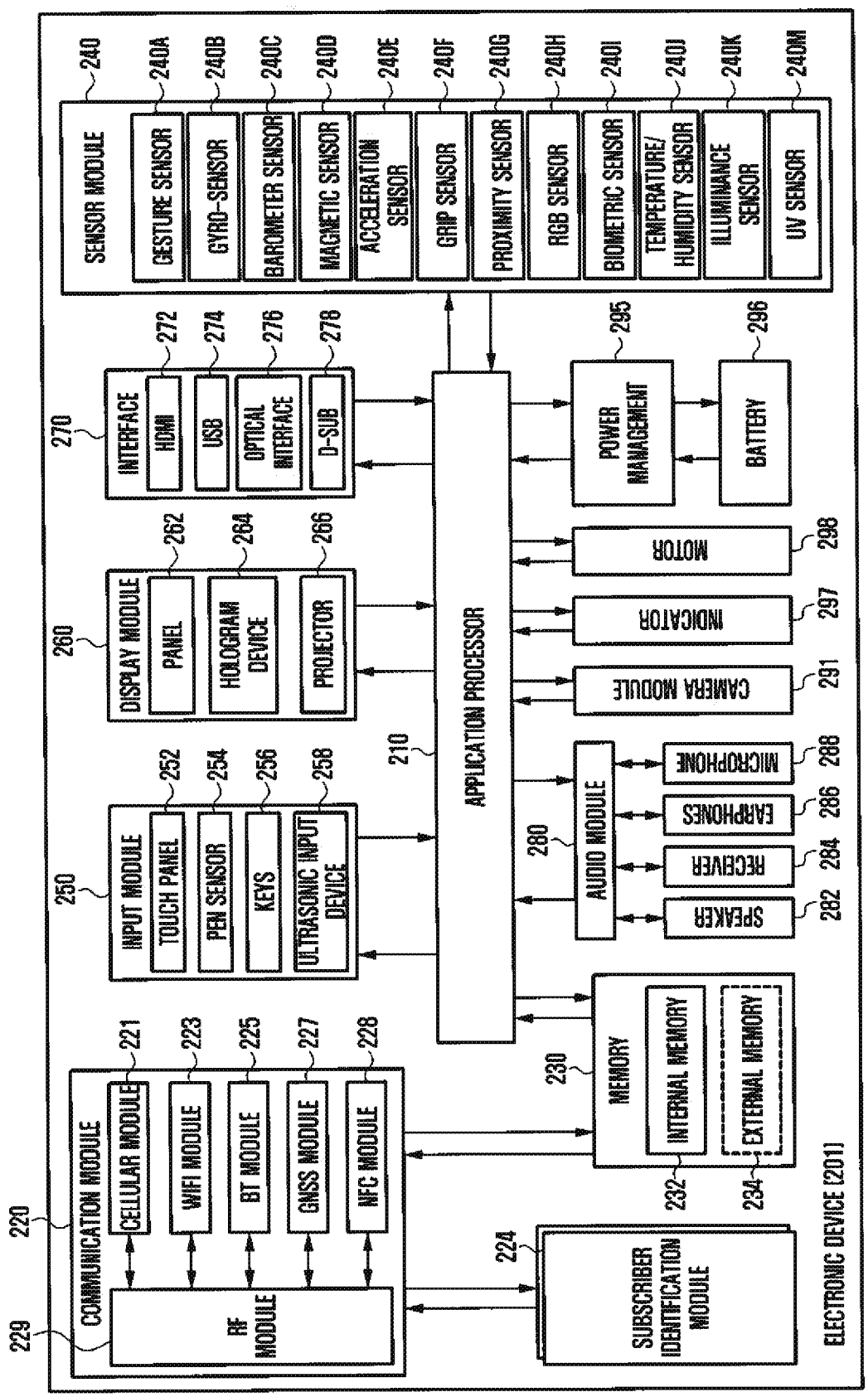
FIG. 2 is a block diagram illustrating an electronic device according to various embodiments of the disclosure.

FIG. 2 is a block diagram illustrating an electronic device 201 according to various embodiments. The electronic device 201 may include all or part of the electronic device 101 depicted in FIG. 1. The electronic device 201 may include at least one processor (e.g., AP 210), a communication module 220, a subscriber identity module (SIM) 224, a memory 230, a sensor module 240, an input device 250, a display 260, an interface 270, an audio module 280, a camera module 291, a power management module 295, a battery 296, an indicator 297, and a motor 298. The processor 210 may execute the operation system or application program to control a plurality of hardware or software components connected to the processor 210 and perform various data processing and operations. The processor 210 may be implemented in the form of system on chip (SoC) by way of example. According to an embodiment, the processor 210 may also include a graphic processing unit (GPU) and/or an image signal processor. The processor 210 may include at least part (e.g., cellular module 221) of the components depicted in FIG. 2). The processor 210 may load the command or data received from at least one of other components (e.g., non-volatile memory) onto the volatile memory and store processed result data in the non-volatile memory.

The communication module 220 may have a configuration identical with or similar to that of the communication interface 170 by way of example. For example, the communication module 220 may include a cellular module 221, a Wi-Fi module 223, a Bluetooth module 225, a GNSS module 227, an NFC module 228, and an RF module 229. The cellular module 221 may provide a voice call service, a video call service, a text messaging service, and an Internet access service via a communication network, by way of example. According to an embodiment, the cellular module 221 may identity and authenticate the electronic device 201 and perform identification and authentication on the electronic device 201 in the communication network by means of the subscriber identity module (SIM) 224. According to an embodiment, the cellular module 221 may perform part of the functions of the processor 210. According to an embodiment, the cellular 221 may include a communication processor (CP). According to an embodiment, part of the cellular module 221, the Wi-Fi module 223, the Bluetooth module 225, the GNSS module 227, and the NFC module 228 (e.g., two or more) may be included in an integrated chip (IC) or an IC package. The RF module 229 may transmit/receive a communication signal (e.g., RF signal). The RF module 229 may include a transceiver, a power amplification module (PAM), a frequency filter, a low noise amplifier (LNA), and an antenna by way of example. According to an alternative embodiment, at least one of the cellular module 221, the Wi-Fi module 223, the Bluetooth module 225, the GNSS module 227, and the NFC module 228 may transmit/receive an RF signal via a separate RF module. The SIM 224 may include a card containing a subscriber identity module or an embedded SIM and contain unique identity information (e.g., integrated circuit card identifier (ICCID)) or subscriber information (e.g., international mobile subscriber identity (IMSI)).

The memory 230 (e.g., memory 130) may include an internal memory 232 and an external memory 234 by way of example. The internal memory 232 may include at least one of a volatile memory (e.g., DRAM, SRAM, and SDRAM), a non-volatile memory (e.g., one time programmable ROM (OTPROM)), PROM, EPROM, EEPROM, mask ROM, flash ROM, and flash memory, a hard drive, and a solid state drive (SSD) by way of example. The external memory 234 may include flash drive such as compact flash (CF), secure digital (SD), Micro-SD, Mini-SD, extreme digital (xD), multimedia card (MMC), and memory stick. The external electronic device 234 may be functionally or physically connected with the electronic device 201 via various interfaces.

The sensor module 240 may measure physical quantities or detects an operation state of the electronic device 201 and convert the measured or detected information to an electrical signal. The sensor module 240 may include at least one of a gesture sensor 240A, a gyro sensor 240B, a barometric pressure sensor 240C, a magnetic sensor 240D, an acceleration sensor 240E, a grip sensor 240F, a proximity sensor 240G, a color sensor 240H (e.g., a red, green, blue (RGB) sensor), a biometric sensor 240I, a temperature/humidity sensor 240J, an illumination sensor 240K, and an ultraviolet (UV) sensor 240M. Additionally or alternatively, the sensor module 240 may include an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one sensor therein. According to an embodiment, the electronic device 201 may further include another processor configured to control the sensor module 240 as part of or separated from the processor 210, and the another processor may control the sensor module 240 while the processor 210 is in a sleep state.

The input device 250 may include a touch panel 252, a (digital) pen sensor 254, a key 256, or an ultrasonic input device 258 by way of example. The touch panel 252 may use at least one of capacitive, resistive, infrared, or ultrasonic methods by way of example. The touch panel 252 may further include a control circuit. The touch panel 252 may further include a tactile layer to provide tactile response to a user. The (digital) pen sensor 254 may include a sheet for recognition as part of a touch panel or a separate sheet for recognition. The key 256 may include a physical button, an optical key, or a keypad, by way of example. The ultrasonic input device 258 may detect ultrasonic waves generated by an input tool through a microphone (e.g., the microphone 288) and ascertain data corresponding to the detected ultrasonic waves.

The display 260 (e.g., the display 160) may include a panel 262, a hologram device 264, a projector 266, and a control circuit for controlling the aforementioned components. The panel 262 may be implemented to be flexible, transparent, or wearable. The panel 262 may include a touch panel 252 and at least one module. According to an embodiment, the panel 262 may include a pressure sensor (or force sensor) that measures the intensity of touch pressure by a user. The pressure sensor may be implemented integrally with the touch panel 252, or may be implemented as at least one sensor separately from the touch panel 252. The hologram device 264 may display a stereoscopic image in the air using a light interference phenomenon. The projector 266 may display an image by projecting light on a screen. The screen may be placed inside or outside the electronic device 201 by way of example. The interface 270 may include an HDMI 272, a USB 274, an optical interface 276, or a D-subminiature (D-sub) 278 by way of example. The interface 270 may be included in the communication interface 170 shown in FIG. 1 by way of example. Additionally or alternatively, the interface 270 may include a mobile high-definition link (MHL) interface, an SD card/MMC interface, or an infrared data association (IrDA) standard interface.

The audio module 280 may convert sounds into electrical signals and convert electrical signals into sounds. At least some components of the audio module 280 may be included in the input/output interface 145 shown in FIG. 1 by way of example. The audio module 280 may process sound information inputted/outputted through a speaker 282, a receiver 284, an earphone 286, or a microphone 288. The camera module 291, as a device for capturing a still image and a video image, may include at least one image sensor (e.g., a front sensor or a rear sensor), a lens, an image signal processor (ISP), or a flash (e.g., an LED or a xenon lamp). The power management module 295 may manage the power of the electronic device 201. The power management module 295 may include a power management IC (PMIC), a charger IC, or a battery or fuel gauge. The PMIC may support wired and/or wireless charging methods. Examples of the wireless charging method may include a magnetic resonance method, a magnetic induction method, and an electromagnetic method, and the PMIC may further include supplementary circuit such as a coil loop, a resonant circuit, and a rectifier. The battery gauge may measure a remaining capacity of the battery 296, charging voltage and current, and temperature of the battery by way of example. The battery 296 may include a rechargeable battery and/or a solar battery by way of example.

The indicator 297 may display a specific state of the electronic device 201 or part thereof (e.g., the processor 210), such as a booting state, a message state, or a charging state. The motor 298 may convert electrical signals into mechanical vibration and may generate vibration or haptic effect. The electronic device 201 may include a mobile TV-support device (e.g., a GPU) for processing media data generated in compliance with the standards such as digital multimedia broadcasting (DMB), digital video broadcasting (DVB), and mediaFlo™. Each of the above-mentioned components may be configured with at least one component and the name of a corresponding component may vary according to the type of an electronic device. According to various embodiments, the electronic device (e.g., electronic device 201) may be configured without part of the aforementioned components or with additional components; part of the components may be combined into one entity capable of executing the same functions of the components before being combined.

Figure 3:
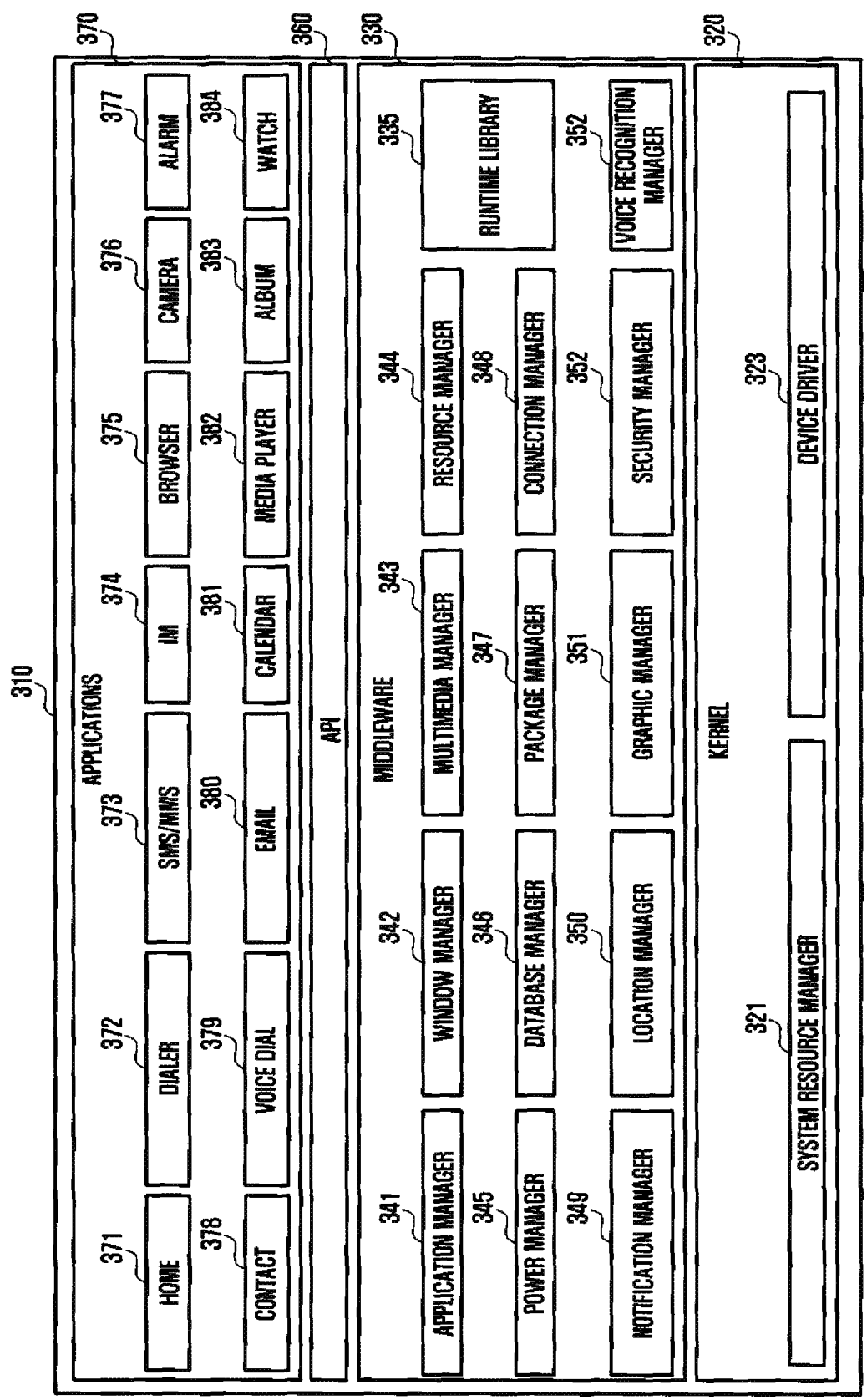
FIG. 3 is a block diagram illustrating a program module according to various embodiments of the disclosure.

FIG. 3 is a block diagram illustrating a program module according various embodiments. According to an embodiment, the program module 310 (e.g., program 140) may include an operating system for controlling the resources of the electronic device (e.g. electronic device 101) and various applications (e.g., application program 147) running on the operating system. The operating system may include Android™, iOS™, Windows™, Symbian™, Tizen™, and Bada™ for example. In reference to FIG. 3, the program module 310 may include a kennel 320 (e.g., kernel 141), a middleware 330 (e.g., middleware 143), an API 360 (e.g., API 145), and an application 370 (e.g., application 147). At least part of the program module 310 may be pre-loaded on the electronic device or downloaded from an external electronic device (e.g., electronic devices 102 and 104).

The kernel 320 may include a system resource manager 321 a device driver 323 by way of example. The system resource manager 321 may control, assign, or withdraw the system resources. According to an embodiment of the present disclosure, the system resource manager 321 may include a process manager, a memory manager, and a pile system manager. The device driver 323 may include a display driver, a camera driver, a Bluetooth driver, a common memory driver, a USB driver, a keypad driver, a Wi-Fi driver, an audio driver, and an inter-process communication (IPC) driver. The middleware 330 may provide a function for use by the applications in common and various functions for allowing the applications 370 to use the restricted system resources of the electronic device efficiently through the API 360. According to various embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, or a voice recognition manager 353.

The runtime library 335 may include a library module for use by a compiler to add new functions with a programming language while the applications 370 are in running. The runtime library 335 may perform input/output management, memory management, and arithmetic function processing. The application manager 341 may manage the life cycles of the applications 370 by way of example. The window manager 342 may manage the GUI resources in use for screens. The multimedia manager 343 may check the formats of media files to encode or decode the media files using the codecs proper to the corresponding formats. The resource manager 344 may manage source codes of the applications 370 and memory space. The power manager 345 may manage battery capacity and power by way of example and provide power information necessary for the operation of the electronic device. According to an embodiment, the power manager 345 may interoperate with a basic input/output system (BIOS). The database manager 346 may generate, search, and modify a database for use by the applications 370 by way of example. The package manager 347 may manage installation and update of application distributed in the form of a package file.

The connectivity manager 348 may manage a wireless connection by way of example. The notification manager 349 may provide the user with events such as incoming message alarm, appointment alarm, and proximity alarm by way of example. The location manager 350 may manage location information of the electronic device. The graphic manager 351 may manage graphical effects and user interfaces to be provided to user by way of example. The security manager 352 may responsible for system security and user authentication by way of example.

The voice recognition manager 353 may process, for example, a voice inputted to the electronic device. According to various embodiments, the voice recognition manager 353 may generate, for example, recorded data in which a user voice inputted through a microphone (not shown) (e.g., the microphone 288) is recorded. The voice recognition manager 353 may store, for example, the generated recorded data in a memory (not shown) (e.g., the memory 130). The voice recognition manager 353 may generate, for example, recorded data including data on time related to recording of a user voice (e.g., a time point when recording of the user voice starts or ends).

According to various embodiments, the voice recognition manager 353 may recognize, for example, a user voice included in the recorded data and extract data related to the user voice from the recorded data. The voice recognition manager 353 may extract, for example, data on the waveform of the user voice from the recorded data. The voice recognition manager 353 may store, for example, data on the waveform of the user voice in the memory. At this time, the voice recognition manager 353 may store, for example, data on the user corresponding to the waveform of the user voice in the memory together with the data on the waveform of the user voice.

The voice recognition manager 353 may determine, for example, whether a command related to a function of the electronic device is included in the recorded data. For example, the voice recognition manager 353 may recognize a user voice by using a natural language processing (NLP) technique and extract a word included in the user voice. Further, the voice recognition manager 353 may determine whether the extracted word corresponds to the command related to the function. Here, the NLP technique may include, for example, a technique of mechanically analyzing human language phenomena and processing the electronic device to recognize the meaning of the language phenomena. For example, when the user voice includes "connect a smart phone and send a file", the voice recognition manager 353 may recognize the meanings of "smart phone", "connect", "file", and "send", and extract, from the recorded data, a command for requesting a communication connection function and a command for requesting a file transfer function.

According to various embodiments, the voice recognition manager 353 may generate, for example, authentication data for a communication connection with an external electronic device, based on the recorded data. Here, the authentication data may be, for example, data used for determining an external electronic device to which a communication connection is made when the electronic device performs a communication connection function. For example, the voice recognition manager 353 may generate the authentication data composed of letters and/or numbers in accordance with a predetermined rule, based on at least one of data on time related to recording of a user voice, the number of words and syllables included in the user voice, and data on the waveform of the user voice. For example, the voice recognition manager 353 may generate authentication data including identification data of the electronic device (e.g., address of the electronic device). The voice recognition manager 353 may store, for example, the generated authentication data in the memory.

According to an embodiment, the middleware 330 may include a telephony manager for managing voice and video call functions of the electronic device and a middleware module capable of combining the functions of the aforementioned components. According to an embodiment, the middleware 330 may provide operation system type-specific modules. The middleware 330 may delete part of the existing components or add new components dynamically. The API 360 may provide operating system type-specific API program functions sets by way of example. For example, it may be possible to a set of APIs per platform for the case of the android or iOS and two or more sets of APIs per platform for the case of the Tizen.

The applications 370 may include a home 371, a dialer 372, an SMS/MMS 373, an instant message (IM) 374, a browser 375, a camera 376, an alarm 377, a contact 378, a voice dial 379, an email 380, a calendar 381, a media player 382, an album 383, a watch 384, a health care (e.g., workout amount and blood sugar), environmental information provision application (e.g., atmospheric pressure, humidity, and temperature). According to an embodiment, the application 370 may include an information exchange application for supporting information exchange between the electronic device and an external electronic device. The information exchange application may include a notification relay application for relaying specific information to the external electronic device and a device management application for managing the external electronic device by way of example. The notification relay application may relay notification information generated by another application of the electronic device to the external electronic device or provide the user with the notification information received from the external electronic device. The device management application may manage the functions of the external electronic device (e.g., turn-on/off of the external electronic device in itself (or a component thereof) and brightness (or resolution) adjustment of the display) communicating with the electronic device and install, uninstall, or update the applications operating on the external electronic device by way of example. According to an embodiment, the application 370 may include an application (e.g., healthcare application of a mobile medical device) designated according to the property of the external electronic device. According to an embodiment, the applications 370 may include an application received from the external electronic device. At least part of the application module 310 may be implemented (e.g., executed) in the form of software, firmware, hardware, or a combination of at least two thereof and include a module, a program, a routine, a command set, or a process for performing at least one function.

The term "module" used in this disclosure may mean a unit including, for example, one or a combination of hardware, software, and firmware. The term "module" may be interchangeably used with other terms, for example, such as unit, logic, logical block, component, or circuit. The "module" may be the minimum unit, or a part thereof, of an integrally constructed component. The "module" may be the minimum unit, or a part thereof, for performing one or more functions. The "module" may be implemented mechanically or electronically. For example, according to the present disclosure, the "module" may include at least one of an application-specific integrated circuit (ASIC) chip, field-programmable gate arrays (FPGAs), and a programmable-logic device, which are known or to be developed later and perform particular functions. According to various embodiments, at least a part of the device (e.g., modules or functions thereof) or the method (e.g., operations) may be implemented as instructions stored in a non-transitory computer-readable storage medium (e.g., the memory 130) in a programming module form. When the instructions are executed by a processor (e.g., 120), the processor may perform a function corresponding to the instructions. The non-transitory computer-readable recording medium may include magnetic media such as a hard disk, a floppy disk, and a magnetic tape, optical media such as a CD-ROM and a DVD, magneto-optical media such as a floptical disk, and hardware devices specially configured to store and perform a program instruction. In addition, the program instructions may include high class language codes, which can be executed in a computer by using an interpreter, as well as machine codes made by a compiler. A module or programming module according to various embodiments may include or exclude at least one of the above-discussed components or further include any other component. The operations performed by the module, programming module, or any other component according to various embodiments may be executed sequentially, in parallel, repeatedly, or by a heuristic method. Additionally, some operations may be executed in different orders or omitted, or any other operation may be added.

Figure 4:
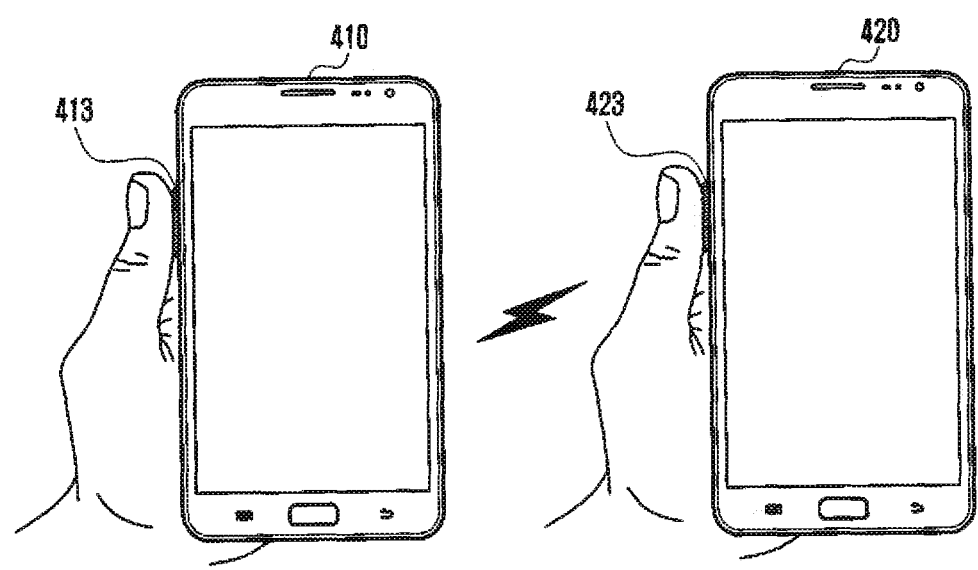
FIG. 4 is a diagram schematically illustrating a communication connection using a voice between electronic devices according to various embodiments of the disclosure.

FIG. 4 is a diagram schematically illustrating a communication connection using a voice between electronic devices according to various embodiments of the disclosure. According to various embodiments, each of a first electronic device 410 and a second electronic device 420 may include all or parts of the electronic device 101 shown in FIG. 1.

Although FIG. 4 shows two electronic devices 410 and 420 to describe a communication connection operation using a voice, the disclosure is not limited thereto. The communication connection may be possible for two or more electronic devices.

Referring to FIG. 4, the first electronic device 410 and the second electronic device 420 may include keys 413 and 423 (e.g., the key 256), respectively, for activating a voice receiving function in order to perform a communication connection function using a voice. The key 413 or 423 may be variously implemented, for example, as a physical button, an optical key, a virtual button provided on a user interface, or the like. Although the physical button is described as an example in this embodiment, the disclosure is not limited to this embodiment. The voice receiving function may refer to a function of receiving a user voice by activating a microphone (not shown) (e.g., the microphone 288) included in each of the first electronic device 410 and the second electronic device 420.

According to various embodiments, the first electronic device 410 and the second electronic device 420 may activate the voice receiving function when receiving a user input of pressing the keys 413 and 423. For example, when the user input of pressing the keys 413 and 423 is received, the first electronic device 410 and the second electronic device 420 may activate the microphones (not shown) (e.g., the microphone 288) and receive a user voice. Alternatively, while a state of pressing the keys 413 and 423 is maintained, the first electronic device 410 and the second electronic device 420 may activate the microphone and receive the user voice. When the user input of pressing the keys 413 and 423 is released, the first electronic device 410 and the second electronic device 420 may release the voice receiving function.

According to various embodiments, the first electronic device 410 and the second electronic device 420 may generate recorded data in which the user voice inputted through the microphone is recorded. For example, while a state of pressing the keys 413 and 423 is maintained, the first electronic device 410 and the second electronic device 420 may generate the recorded data in which the user voice inputted through the microphone is recorded. In addition, when the user voice is inputted through the microphone while the user input of pressing the keys 413 and 423 is received, the first electronic device 410 and the second electronic device 420 may generate the recoded data including data on a time related to recording the user input (e.g., a time point when the recording of the user voice starts or ends).

According to various embodiments, when the user input of pressing the keys 413 and 423 is released, the first electronic device 410 and the second electronic device 420 may recognize the user voice included in the generated recorded data and extract data related to the user voice from the recorded data. For example, the first electronic device 410 and the second electronic device 420 may extract data on the waveform of the user voice from the recorded data. For example, the first electronic device 410 and the second electronic device 420 may determine whether a command related to a function of the electronic device is included in the recorded data. For example, when the user voice includes "connect a smart phone and send a file", the first electronic device 410 and the second electronic device 420 may recognize the meanings of "smart phone", "connect", "file", and "send", extract a command for a communication connection function from "smart phone" and "connect", and extract a command for a file transfer function as a function to be performed after the communication connection from "file" and "send".

According to various embodiments, the first electronic device 410 and the second electronic device 420 may determine a mode of the electronic device, based on, for example, the recorded data recording the user voice. For example, when a user input of pressing the keys 413 and 423 is received while performing a specific function (e.g., playing a video), the first electronic device 410 and the second electronic device 420 may process a user voice input. At this time, the first electronic device 410 and the second electronic device 420 may extract a word (e.g., "video file", "send") included in the user voice from the recorded data. When the extracted word corresponds to a specific function performed in the first electronic device 410 and the second electronic device 420, the mode of the corresponding electronic device performing the specific function may be determined as a master mode. On the other hand, when the extracted word does not correspond to a specific function performed in the electronic device, the mode of the corresponding electronic device may be determined as a slave mode.

In another example, the first electronic device 410 and the second electronic device 420 may extract a word included in the user voice from the recoded data. In this case, the first electronic device 410 and the second electronic device 420 may search the memory to determine whether a file corresponding to the word extracted from the recorded data is stored in the memory. Also, the first electronic device 410 and the second electronic device 420 may determine the mode of an electronic device storing the file corresponding to the extracted word as a master mode, and determine the mode of an electronic device not storing the file corresponding to the extracted word as a slave mode.

The first electronic device 410 and the second electronic device 420 may previously register data on the waveform of a user voice to authenticate the user of the device. In this case, when the waveform of a user voice extracted from the recorded data is identical to the waveforin of a preregistered user voice, the mode of the corresponding device may be determined as a master mode. On the other hand, when the waveform of the user voice extracted from the recorded data is not identical to the waveform of the preregistered user voice, the mode of the corresponding device may be determined as a slave mode.

According to various embodiments, each of the first electronic device 410 and the second electronic device 420 may generate authentication data for a communication connection, for example, based on the recorded data. In this case, when a command for a communication connection function is extracted from the recorded data, the first electronic device 410 and the second electronic device 420 may generate authentication data for a communication connection.

For example, the first electronic device 410 and the second electronic device 420 may generate authentication data composed of letters, numbers, or a combination thereof in accordance with a predetermined rule, based on at least one of data on time related to recording of a user voice, the number of words and syllables included in the user voice, and data on the waveform of the user voice. For example, each of the first electronic device 410 and the second electronic device 420 may generate authentication data including identification data (e.g., address of the electronic device).

According to various embodiments, the first electronic device 410 and the second electronic device 420 may transmit the generated authentication data to the outside via a communication module (not shown) (e.g., the communication module 220). For example, the first electronic device 410 and the second electronic device 420 may transmit the authentication data according to various wireless communication schemes (e.g., wireless local area network (WLAN), Bluetooth, WiFi Direct, near field communication (NFC), etc.). Although it will be described hereinafter that a communication connection is made according to the Wi-Fi Direct scheme, the disclosure is not limited to that.

According to various embodiments, the first electronic device 410 and the second electronic device 420 may receive authentication data sent by other electronic device via the communication module. For example, the first electronic device 410 and the second electronic device 420 may determine whether the received authentication data of other electronic device is data for performing a communication connection function, and further determine whether that electronic device is a target electronic device of communication connection. For example, each of the first electronic device 410 and the second electronic device 420 may compare the received authentication data of other electronic device with authentication data generated by itself to determine whether the time related to recording of a user voice is identical, whether the number of words and syllables included in the user voice is identical, and/or whether the waveform of the user voice is identical. Through this, authentication for the authentication data received from other electronic device may be processed.

According to various embodiments, the first electronic device 410 and the second electronic device 420 may perform a communication connection with a target electronic device of the communication connection. For example, when the received authentication data includes a device address of the target electronic device, the first electronic device 410 and the second electronic device 420 may perform a communication connection with the target electronic device by using the device address.

According to various embodiments, the first electronic device 410 and the second electronic device 420 may perform a function between communication-connected devices, the function being included in a user voice and to be performed after the communication connection. For example, when the user voice includes a command for a file transfer function (e.g., transmission of a video file being played currently), an electronic device determined as a master mode may transmit a video file, being played therein, to an electronic device determined as a slave mode. Meanwhile, when the function included in the user voice and to be performed after the communication connection is performed completely, the first electronic device 410 and the second electronic device 420 may automatically release the communication connection with the counterpart electronic device.

Figure 5:
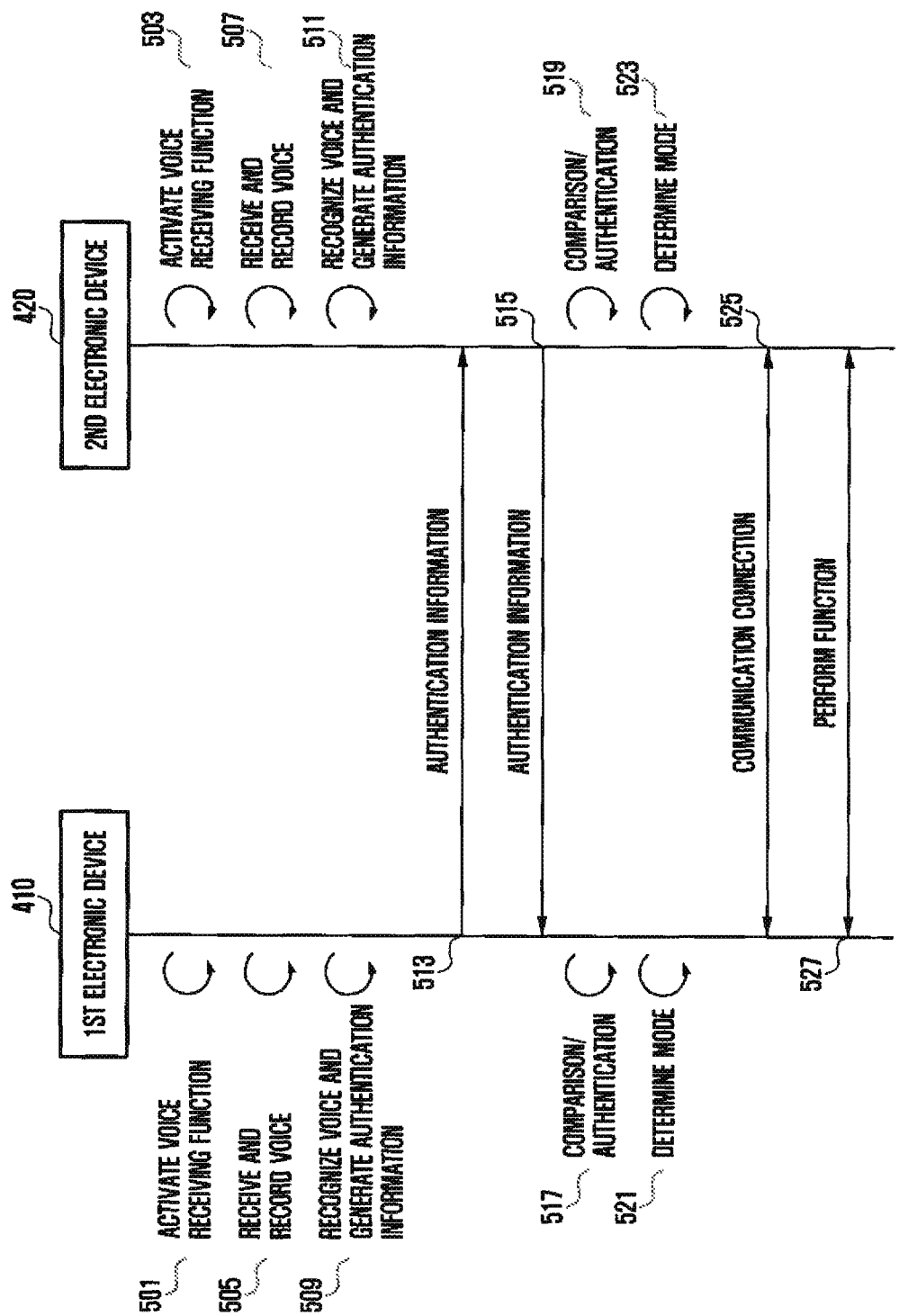
FIG. 5 is a flow diagram illustrating a communication connection method using a voice between electronic devices of FIG. 4.

FIG. 5 is a flow diagram illustrating a communication connection method using a voice between electronic devices of FIG. 4.

According to various embodiments, at operations 501 and 503, the first electronic device 410 and the second electronic device 420 may activate a voice receiving function when receiving a user input of pressing a key.

According to various embodiments, at operations 505 and 507, the first electronic device 410 and the second electronic device 420 may receive a user voice by activating a microphone and generate recorded data in which the user voice received through the microphone is recorded. For example, the user may input a voice including "connect a smart phone and send a file" in the first electronic device 410 and the second electronic device 420 while manually pressing the keys of the first electronic device 410 and the second electronic device 420. Then, when the user detaches the finger from the keys after the voice input is completed, the user input of pressing the keys may be released. In addition, when the user voice is inputted through the microphone while the user input of pressing the keys 413 and 423 is received, the first electronic device 410 and the second electronic device 420 may generate the recoded data including data on a time related to recording the user input (e.g., a time point when the recording of the user voice starts or ends).

According to various embodiments, at operations 509 and 511, when the user input of pressing the keys 413 and 423 is released, the first electronic device 410 and the second electronic device 420 may recognize the user voice included in the generated recorded data and extract data related to the user voice from the recorded data. For example, the first electronic device 410 and the second electronic device 420 may extract data on the waveform of the user voice from the recorded data. For example, the first electronic device 410 and the second electronic device 420 may recognize the meanings of "smart phone", "connect", "file", and "send", extract a command for a communication connection function from "smart phone" and "connect", and extract a command for a file transfer function as a function to be performed after the communication connection from "file" and "send". On the other hand, the first electronic device 410 and the second electronic device 420 may extract a command for the communication connection function from "file" and "send".

According to various embodiments, when a command for the communication connection function is extracted from the recorded data, the first electronic device 410 and the second electronic device 420 may generate authentication data for the communication connection.

For example, the first electronic device 410 and the second electronic device 420 may generate authentication data composed of letters, numbers, or a combination thereof in accordance with a predetermined rule, based on at least one of data on time related to recording of a user voice, the number of words and syllables included in the user voice, and data on the waveform of the user voice. For example, each of the first electronic device 410 and the second electronic device 420 may generate authentication data including a device address.

According to various embodiments, at operations 513 and 515, the first electronic device 410 and the second electronic device 420 may transmit the generated authentication data to the outside via the communication module, and receive authentication data transmitted by other electronic device.

According to various embodiments, at operations 517 and 519, the first electronic device 410 and the second electronic device 420 may determine whether the received authentication data of other electronic device is data for performing the communication connection function, and further determine whether that electronic device is a target electronic device of communication connection. For example, each of the first electronic device 410 and the second electronic device 420 may compare the received authentication data of other electronic device with authentication data generated by itself to determine whether the time related to recording of a user voice is identical, whether the number of words and syllables included in the user voice is identical, and/or whether the waveform of the user voice is identical.

According to various embodiments, at operations 521 and 523, the first electronic device 410 and the second electronic device 420 may determine a mode, based on the recorded data in which the user voice is recorded.

Meanwhile, the first electronic device 410 and the second electronic device 420 may first determine the mode, based on the recorded data, before sending the authentication data to the outside via the communication module. In this case, at the operations 513 and 515, the first electronic device 410 and the second electronic device 420 may send the authentication data including data on the determined mode via the communication module, and receive authentication data including data on a mode transmitted by other electronic device. When it is confirmed that the modes of both the first electronic device 410 and the second electronic device 420 are master modes, the first electronic device 410 and the second electronic device 420 may determine again, at the operations 521 and 523, the mode by using data on the waveform of the user voice extracted from the recorded data. For example, when the waveform of a user voice extracted from the recorded data is identical to the waveform of a preregistered user voice, the mode of the corresponding device may be determined as a master mode. On the other hand, when the waveform of the user voice extracted from the recorded data is not identical to the waveform of the preregistered user voice, the mode of the corresponding device may be determined as a slave mode.

According to various embodiments, at operation 525, the first electronic device 410 and the second electronic device 420 may perform a communication connection with a target device of the communication connection. For example, when the received authentication data includes a device address, the first electronic device 410 and the second electronic device 420 may perform the communication connection with the target electronic device by using the device address included in the received authentication data.

According to various embodiments, at operation 527, the first electronic device 410 and the second electronic device 420 may perform a function between communication-connected devices, the function being included in the user voice and to be performed after the communication connection. For example, when the user voice includes a command for a file transfer function (e.g., transmission of a video file being played currently), an electronic device determined as a master mode may transmit a video file, being played therein, to an electronic device determined as a slave mode.

Figure 6:
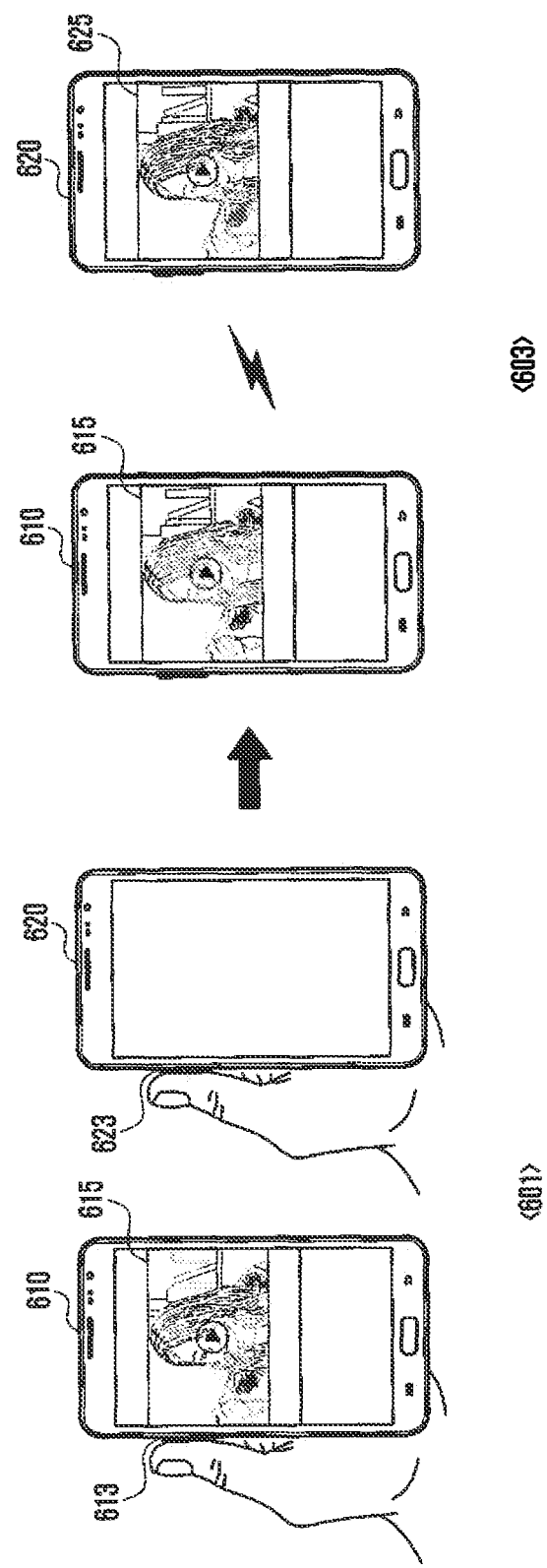
FIG. 6 is a diagram illustrating performing a communication connection using a voice between electronic devices and thereafter performing a function corresponding to the voice according to various embodiments of the disclosure.

FIG. 6 is a diagram illustrating performing a communication connection using a voice between electronic devices and thereafter performing a function corresponding to the voice according to various embodiments of the disclosure. According to various embodiments, each of a first electronic device 610 and a second electronic device 620 may include all or parts of the electronic device 101 shown in FIG. 1. The same descriptions as those given above in FIGS. 4 and 5 will be omitted.

According to various embodiments, as indicated by reference numeral 601, a user may input a voice (e.g., "send a video file") into the first electronic device 610 and the second electronic device 620 while pressing keys 613 and 623 of the first and second electronic devices 610 and 620. Then, the first and second electronic devices 610 and 620 that receive the user voice may recognize the meanings of "video file" and "send" included in the user voice and identify a command for a function of sending a video file.

According to various embodiments, as indicated by reference numeral 603, the first and second electronic devices 610 and 620 may perform a communication connection, based on the user voice. In addition, based on a command for a function included in the user voice, the first and second electronic devices 610 and 620 may perform a video file transfer function after the communication connection. In this case, a mode of the first electronic device 610 that is performing a function related to a video file 615 may be determined as a master mode, and a mode of the second electronic device 620 may be determined as a slave mode. Then, the first electronic device 610 determined to be in the master mode may transmit the video file 615 to the second electronic device 620 determined to be in the slave mode. Also, the second electronic device 620 being in the slave mode may perform a function related to the video file 625 received from the first electronic device 610 being in the master mode.

Figure 7A:
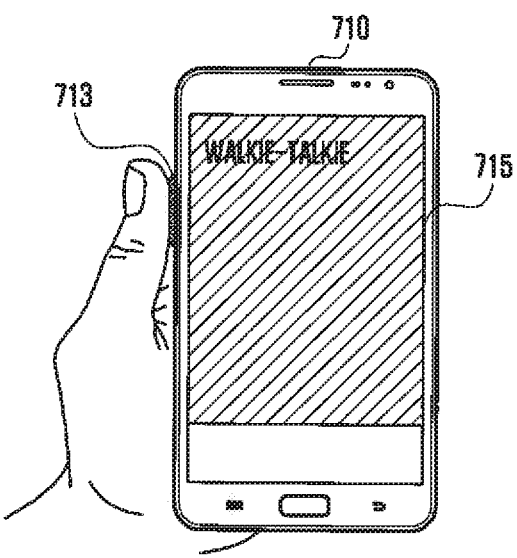
FIGS. 7A and 7B are diagrams illustrating performing a communication connection using a voice between electronic devices and thereafter performing a function corresponding to the voice according to various embodiments of the disclosure.
Figure 7A:
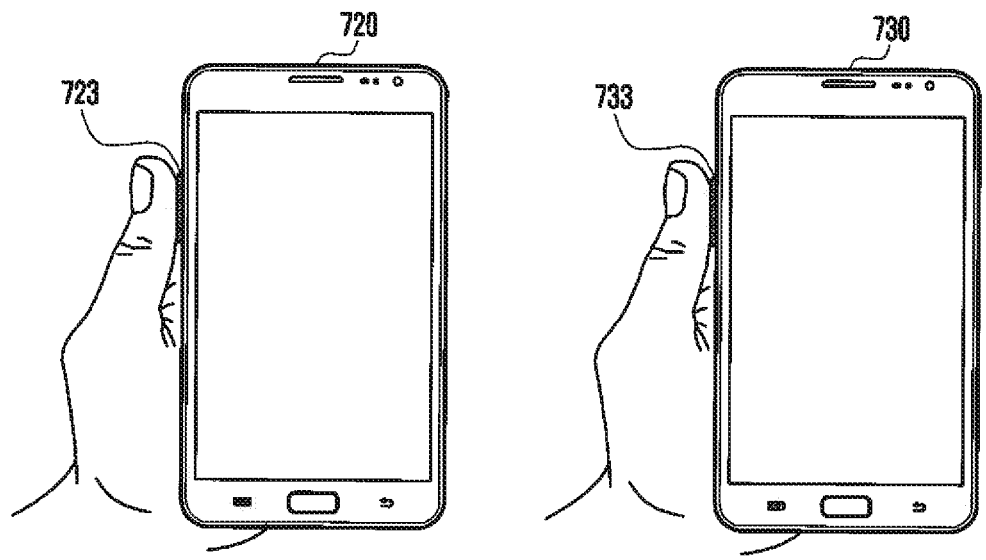
Figure 7B:
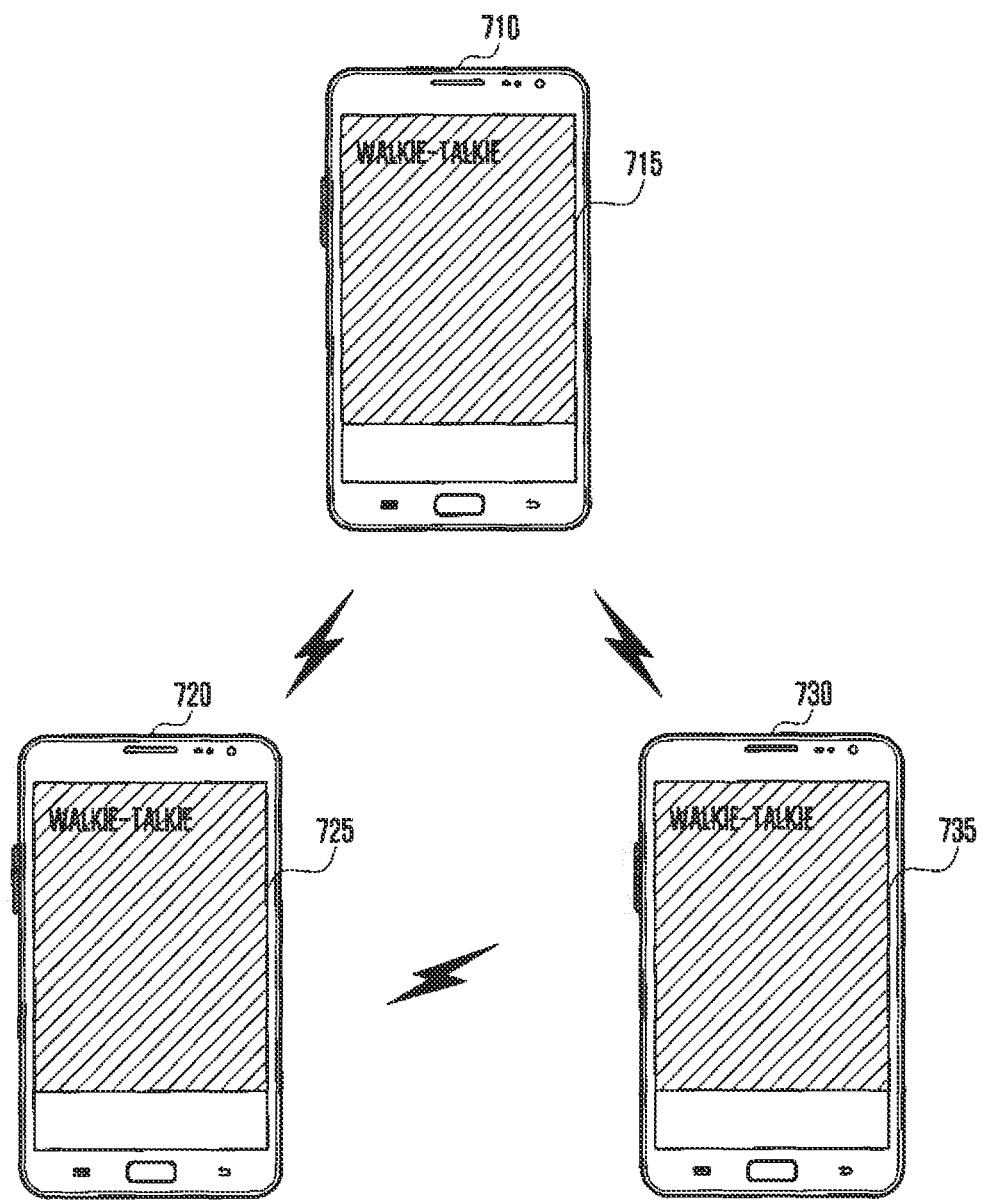

FIGS. 7A and 7B are diagrams illustrating performing a communication connection using a voice between electronic devices and thereafter performing a function corresponding to the voice according to various embodiments of the disclosure. According to various embodiments, each of a first electronic device 710, a second electronic device 720 and a third electronic device 730 may include all or parts of the electronic device 101 shown in FIG. 1. The same descriptions as those given above in FIGS. 4 and 5 will be omitted.

According to various embodiments, as shown in FIG. 7A, a user may input a voice (e.g., "connect walkie-talkie") into the first electronic device 710 executing an application (e.g., walkie-talkie 715) and the second and third electronic devices 720 and 730 executing no application while pressing keys 713, 723 and 733 of the first, second and third electronic devices 710, 720 and 730. The walkie-talkie generally refers to a two-way wireless device for short-range communication and may mean, in embodiments, an application of an electronic device capable of performing a walkie-talkie function. Then, the first, second and third electronic devices 710, 720 and 730 that receive the user voice may recognize the meanings of "walkie-talkie" and "connect" included in the user voice and identify a command for executing a walkie-talkie application.

According to various embodiments, as shown in FIG. 7B, the first, second and third electronic devices 710, 720 and 730 may perform a communication connection, based on the user voice. At this time, the first, second and third electronic devices 710, 720 and 730 may be connected using a single communication channel. In addition, based on a command for a function included in the user voice, the first, second and third electronic devices 710, 720 and 730 may perform a function of executing a walkie-talkie application. In this case, a mode of the first electronic device 710 that is executing the performing walkie-talkie application may be determined as a master mode, and modes of the second and third electronic devices 720 and 730 may be determined as a slave mode. Then, the second and third electronic devices 720 and 730 being in the slave mode may receive a command for executing a walkie-talkie application from the first electronic device 710 being in the master mode and execute walkie-talkie applications 725 and 735. If the second and third electronic devices 720 and 730 have no walkie-talkie applications installed therein, the second and third electronic devices 720 and 730 may first install and then execute the walkie-talkie applications 725 and 735.

Figure 8:
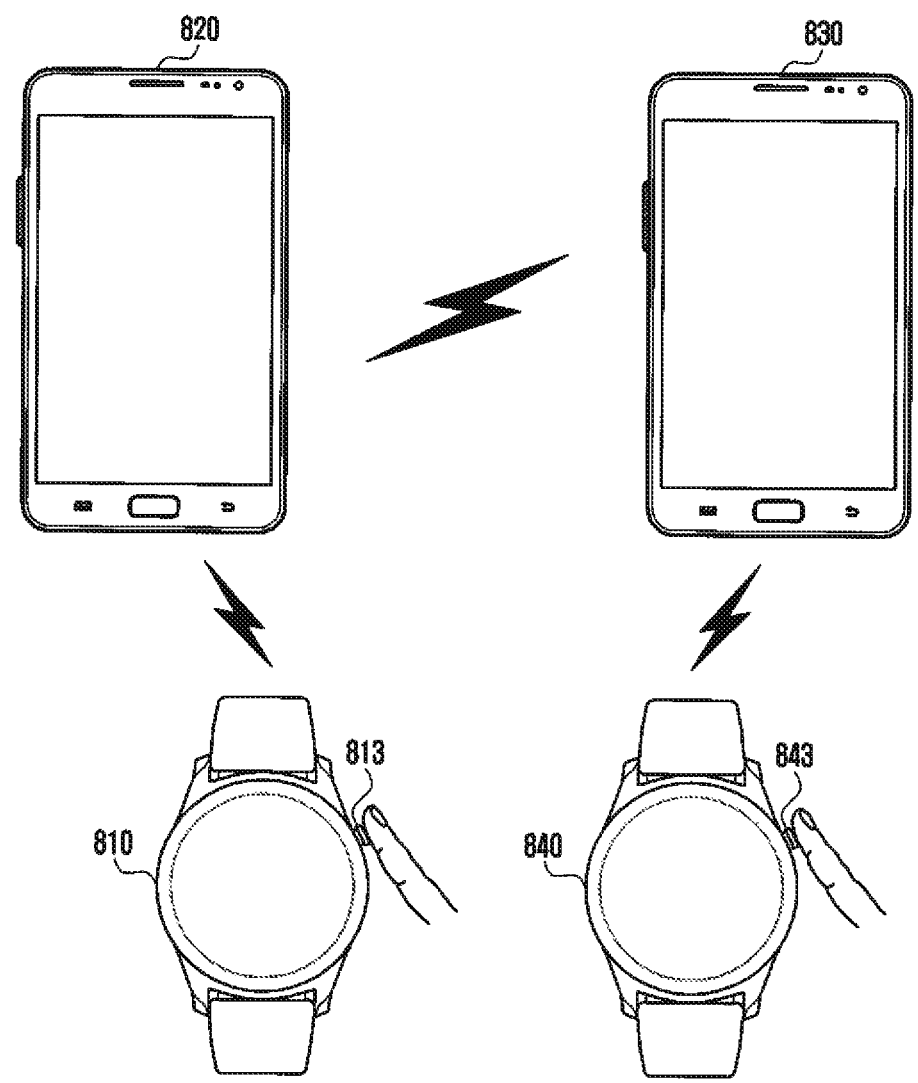
FIG. 8 is a diagram schematically illustrating a communication connection using a voice between electronic devices according to various embodiments of the disclosure.

FIG. 8 is a diagram schematically illustrating a communication connection using a voice between electronic devices according to various embodiments of the disclosure. According to various embodiments, each of a first electronic device 810, a second electronic device 820, a third electronic device 830 and a fourth electronic device 840 may include all or parts of the electronic device 101 shown in FIG. 1.

According to various embodiments, as shown in FIG. 8, before a communication connection using a voice is performed between electronic devices, the first and second electronic devices 810 and 820 may have been already communication-connected to each other, and the third and fourth electronic devices 830 and 840 may have been already communication-connected to each other.

According to various embodiments, the first electronic device 810 and the fourth electronic device 840 may include keys 813 and 823 (e.g., the key 256), respectively, for activating a voice receiving function in order to perform a communication connection function using a voice. The key 813 or 823 may be variously implemented, for example, as a physical button, an optical key, a virtual button provided on a user interface, or the like. Although the physical button is described as an example in this embodiment, the disclosure is not limited to this embodiment. The voice receiving function may refer to a function of receiving a user voice by activating a microphone included in the first electronic device.

According to various embodiments, the first and fourth electronic devices 810 and 840 may activate the voice receiving function when receiving a user input of pressing the keys 813 and 843. For example, when the user input of pressing the keys 813 and 843 is received, the first and fourth electronic devices 810 and 840 may activate the microphones (not shown) (e.g., the microphone 288) and receive a user voice. Alternatively, while a state of pressing the keys 813 and 843 is maintained, the first and fourth electronic devices 810 and 840 may activate the microphone and receive the user voice. When the user input of pressing the keys 813 and 843 is released, the first and fourth electronic devices 810 and 840 may release the voice receiving function.

According to various embodiments, the first and fourth electronic device 810 and 840 may generate recorded data in which the user voice inputted through the microphone is recorded. For example, while a state of pressing the keys 813 and 843 is maintained, the first and fourth electronic devices 810 and 840 may generate the recorded data in which the user voice inputted through the microphone is recorded. In addition, when the user voice is inputted through the microphone while the user input of pressing the keys 813 and 843 is received, the first and fourth electronic devices 810 and 840 may generate the recoded data including data on a time related to recording the user input (e.g., a time point when the recording of the user voice starts or ends).

According to various embodiments, when the user input of pressing the keys 813 and 843 is released, the first and fourth electronic devices 810 and 840 may transmit the generated recorded data to the second and third electronic devices 820 and 830, respectively, which are communication-connected.

According to various embodiments, the second and third electronic device 820 and 830 may recognize the user voice included in the recorded data, which are received from the first and fourth electronic devices 810 and 840, respectively, and extract data related to the user voice from the recorded data. For example, the second and third electronic devices 820 and 830 may extract data on the waveform of the user voice from the recorded data. For example, the second and third electronic devices 820 and 830 may determine whether a command related to a function is included in the recorded data. For example, when the user voice includes "connect a smart phone and send an image file", the second and third electronic devices 820 and 830 may recognize the meanings of "smart phone", "connect", "image file", and "send", extract a command for a communication connection function from "smart phone" and "connect", and extract a command for a file transfer function as a function to be performed after the communication connection from "image file" and "send".

According to various embodiments, the second and third electronic devices 820 and 830 may determine a mode of the electronic device, based on, for example, the recorded data recording the user voice.

For example, when the recorded data is received from the first and fourth electronic devices 810 and 840 while performing a specific function (e.g., display an image file), the third and fourth electronic devices 820 and 830 may process the received recoded data. At this time, the second and third electronic devices 820 and 830 may extract, from the recorded data, a word (e.g., "image file", "send") included in the user voice. When the extracted word corresponds to a specific function, the mode of the electronic device performing the specific function may be determined as a master mode. On the other hand, when the extracted word does not correspond to a specific function performed in the electronic device, the mode of the corresponding electronic device may be determined as a slave mode.

In another example, the second and third electronic devices 820 and 830 may extract a word included in the user voice from the recoded data. In this case, the second and third electronic devices 820 and 830 may search for data stored in respective memories (not shown) (e.g., the memory 130). Also, the second and third electronic devices 820 and 830 may determine the mode of an electronic device storing the file corresponding to the extracted word as a master mode, and determine the mode of an electronic device not storing the file corresponding to the extracted word as a slave mode.

The second and third electronic devices 820 and 830 may previously register data on the waveform of a user voice to authenticate the user of the device. In this case, when the waveform of a user voice extracted from the recorded data is identical to the waveform of a preregistered user voice, the mode of the corresponding device may be determined as a master mode. On the other hand, when the waveform of the user voice extracted from the recorded data is not identical to the waveform of the preregistered user voice, the mode of the corresponding device may be determined as a slave mode.

Meanwhile, the second and third electronic devices 820 and 830 may identify functions being performed in the first and fourth electronic devices 810 and 840 which have been communication-connected. For example, the second and third electronic devices 820 and 830 may request the first and fourth electronic devices 810 and 840 to inform functions being currently performed therein. Also, the second and third electronic devices 820 and 830 may extract, from the recorded data, a word (e.g., "image file", "send") included in the user voice and, based on the functions being performed in the first and fourth electronic devices 810 and 840 and the word included in the user voice, determine the mode of each of the second and third electronic devices 820 and 830. For example, when the first electronic device 810 is performing a function of displaying an image file, the mode of the second electronic device 820 may be determined as a master mode. On the other hand, when the fourth electronic device 840 is not performing a function of displaying an image file, the mode of the third electronic device 880 may be determined as a slave mode.

According to various embodiments, each of the second and third electronic devices 820 and 830 may generate authentication data for a communication connection, for example, based on the recorded data. In this case, when a command for a communication connection function is extracted from the recorded data, the second and third electronic devices 820 and 830 may generate the authentication data.

According to various embodiments, the second and third electronic devices 820 and 830 may generate authentication data composed of letters, numbers, or a combination thereof in accordance with a predetermined rule, based on at least one of data on time related to recording of a user voice, the number of words and syllables included in the user voice, and data on the waveform of the user voice. For example, the second and third electronic devices 820 and 830 may generate authentication data including data on the mode of the electronic device.

According to various embodiments, each of the second and third electronic devices 820 and 830 may transmit the generated authentication data to the outside via a communication module (not shown) (e.g., the communication module 220). For example, the second and third electronic devices 820 and 830 may transmit the authentication data including identification data (e.g., address of the electronic device) to the outside.

According to various embodiments, the second and third electronic devices 820 and 830 may receive authentication data sent by other electronic device via the communication module. For example, the second and third electronic devices 820 and 830 may determine whether the received authentication data of other electronic device is data for performing a communication connection function, and further determine whether that electronic device is a target electronic device of communication connection. For example, each of the second and third electronic devices 820 and 830 may compare the received authentication data of other electronic device with authentication data generated by itself to determine whether the time related to recording of a user voice is identical, whether the number of words and syllables included in the user voice is identical, and/or whether the waveform of the user voice is identical. Through this, authentication for the authentication data received from other electronic device may be processed.

According to various embodiments, the second and third electronic devices 820 and 830 may perform a communication connection with a target electronic device of the communication connection. For example, when the received authentication data includes a device address of the target electronic device, the second and third electronic devices 820 and 830 may perform a communication connection with the target electronic device by using the device address.

According to various embodiments, when the communication connection is performed with the target electronic device, the second and third electronic devices 820 and 830 may transmit data on a communication connection status to the first and fourth electronic devices 810 and 840, respectively, which have been communication-connected.

According to various embodiments, when the communication connection is performed with the target electronic device, the second and third electronic devices 820 and 830 may perform a function to be performed after the communication connection between communication-connected devices. For example, each of the second and third electronic devices 820 and 830 may perform a function to be performed after the communication connection, based on the mode thereof.

For example, when the recorded data received from the first and fourth electronic devices 810 and 840 includes a command for a file transfer function (e.g., transmission of an image file), when the second electronic device 820 is displaying an image file corresponding to the command for the file transfer function, and when the third electronic device 830 is not displaying the image file, the second electronic device 820 determined as a master mode may transmit the image file, being displayed, to the third electronic device 830 determined as a slave mode.

Meanwhile, for example, when the recorded data received from the first and fourth electronic devices 810 and 840 includes a command for a file transfer function (e.g., transmission of an image file), when the second, third and fourth electronic devices 820, 830 and 840 are displaying no image file, and when the first electronic device 810 is displaying the image file corresponding to the command for the file transfer function, the second electronic device 820 determined as a master mode may request the first electronic device to transmit the image file, and then transmit the image file, received from the first electronic device, to the third electronic device 830 determined as a slave mode.

According to various embodiments, when the function included in the user voice and to be performed after the communication connection is performed completely, the second and third electronic devices 820 and 830 may automatically release the communication connection with the counterpart electronic device.

Figure 9:
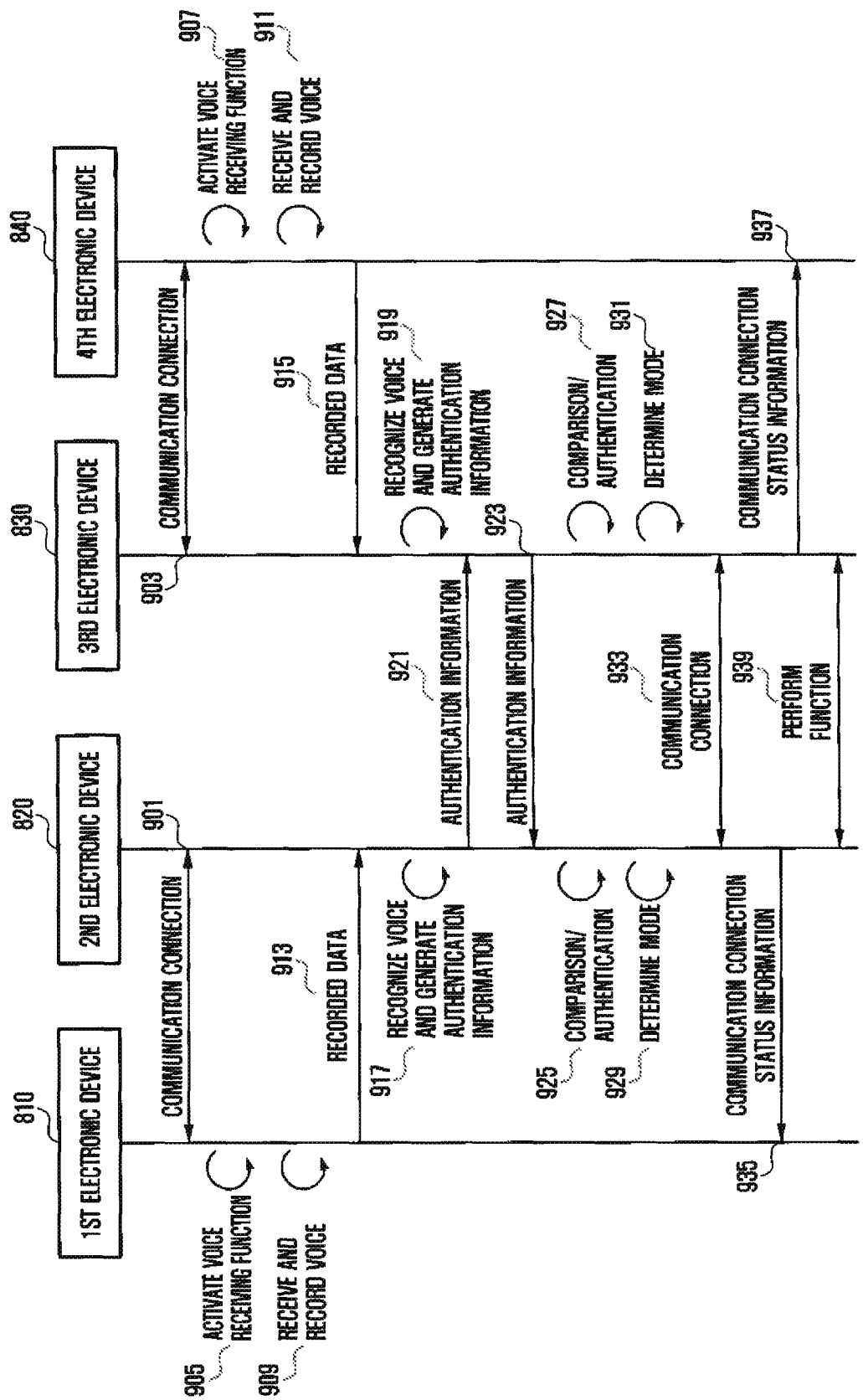
FIG. 9 is a flow diagram illustrating a communication connection method using a voice between electronic devices of FIG. 8.

FIG. 9 is a flow diagram illustrating a communication connection method using a voice between electronic devices of FIG. 8.

According to various embodiments, at operations 901 and 903, the first and fourth electronic devices 810 and 840 may be communication-connected to the second and third electronic devices 820 and 830, respectively.

According to various embodiments, at operations 905 and 907, the first and fourth electronic devices 810 and 840 may activate a voice receiving function when receiving a user input of pressing a key.

According to various embodiments, at operations 909 and 911, the first and fourth electronic devices 810 and 840 may receive a user voice by activating a microphone and generate recorded data in which the user voice received through the microphone is recorded. For example, the user may input a voice including "connect a smart phone and send a file" in the first and fourth electronic devices 810 and 840 while manually pressing the keys of the first and fourth electronic devices 810 and 840. Then, when the user detaches the finger from the keys after the voice input is completed, the user input of pressing the keys may be released. In addition, when the user voice is inputted through the microphone while the user input of pressing the keys is received, the first and fourth electronic devices 810 and 840 may generate the recoded data including data on a time related to recording the user input (e.g., a time point when the recording of the user voice starts or ends).

According to various embodiments, at operations 913 and 915, when the user input of pressing the key is released, the first and fourth electronic devices 810 and 840 may transmit the generated recorded data to the second and third electronic devices 820 and 830, respectively, which are communication-connected.

According to various embodiments, at operations 917 and 919, the second and third electronic devices 820 and 830 may recognize the user voice included in the recorded data, which are received from the first and fourth electronic devices 810 and 840, respectively, and extract data related to the user voice from the recorded data. For example, the second and third electronic devices 820 and 830 may extract data on the waveform of the user voice from the recorded data. For example, the second and third electronic devices 820 and 830 may determine whether a command related to a function is included in the recorded data. For example, when the user voice includes "connect a smart phone and send an image file", the second and third electronic devices 820 and 830 may recognize the meanings of "smart phone", "connect", "image file", and "send", extract a command for a communication connection function from "smart phone" and "connect", and extract a command for a file transfer function as a function to be performed after the communication connection from "image file" and "send".

According to various embodiments, when a command for the communication connection function is extracted from the recorded data, the second and third electronic devices 820 and 830 may generate authentication data for the communication connection. For example, the second and third electronic devices 820 and 830 may generate authentication data composed of letters, numbers, or a combination thereof in accordance with a predetermined rule, based on at least one of data on time related to recording of a user voice, the number of words and syllables included in the user voice, and data on the waveform of the user voice. For example, each of the second and third electronic devices 820 and 830 may generate authentication data including a device address.

According to various embodiments, at operations 921 and 923, the second and third electronic devices 820 and 830 may transmit the generated authentication data to the outside via the communication module, and receive authentication data transmitted by other electronic device.

According to various embodiments, at operations 925 and 927, the second and third electronic devices 820 and 830 may determine whether the received authentication data of other electronic device is data for performing the communication connection function, and further determine whether that electronic device is a target electronic device of communication connection. For example, each of the second and third electronic devices 820 and 830 may compare the received authentication data of other electronic device with authentication data generated by itself to determine whether the time related to recording of a user voice is identical, whether the number of words and syllables included in the user voice is identical, and/or whether the waveform of the user voice is identical.

According to various embodiments, at operations 929 and 931, the second and third electronic devices 820 and 830 may determine a mode, based on the recorded data.

Meanwhile, the second and third electronic devices 820 and 830 may first determine the mode, based on the recorded data, before sending the authentication data to the outside via the communication module. In this case, at the operations 921 and 923, the second and third electronic devices 820 and 830 may send the authentication data including data on the determined mode via the communication module, and receive authentication data including data on a mode transmitted by other electronic device. When it is confirmed that the modes of both the second and third electronic devices 820 and 830 are master modes, the second and third electronic devices 820 and 830 may determine again, at the operations 929 and 931, the mode by using data on the waveform of the user voice extracted from the recorded data.

For example, when the waveform of a user voice extracted from the recorded data is identical to the waveform of a preregistered user voice, the mode of the corresponding device may be determined as a master mode. On the other hand, when the waveform of the user voice extracted from the recorded data is not identical to the waveform of the preregistered user voice, the mode of the corresponding device may be determined as a slave mode.

According to various embodiments, at operation 933, the second and third electronic devices 820 and 830 may perform a communication connection with a target device of the communication connection. For example, when the received authentication data includes a device address, the second and third electronic devices 820 and 830 may perform the communication connection with the target electronic device by using the device address included in the received authentication data.

According to various embodiments, when the communication connection is performed with the target electronic device, the second and third electronic devices 820 and 830 may transmit, at operations 935 and 937, data on a communication connection status to the first and fourth electronic devices 810 and 840, respectively, which have been communication-connected.

According to various embodiments, when the communication connection is performed with the target electronic device, each of the second and third electronic devices 820 and 830 may perform, at operation 939, a function to be performed after the communication connection, based on the mode thereof.

For example, when the recorded data received from the first and fourth electronic devices 810 and 840 includes a command for a file transfer function (e.g., transmission of an image file), when the second electronic device 820 is displaying an image file corresponding to the command for the file transfer function, and when the third electronic device 830 is not displaying the image file, the second electronic device 820 determined as a master mode may transmit the image file, being displayed, to the third electronic device 830 determined as a slave mode.

Meanwhile, for example, when the recorded data received from the first and fourth electronic devices 810 and 840 includes a command for a file transfer function (e.g., transmission of an image file), when the second, third and fourth electronic devices 820, 830 and 840 are displaying no image file, and when the first electronic device 810 is displaying the image file corresponding to the command for the file transfer function, the second electronic device 820 determined as a master mode may request the first electronic device to transmit the image file, and then transmit the image file, received from the first electronic device, to the third electronic device 830 determined as a slave mode.

Figure 10:
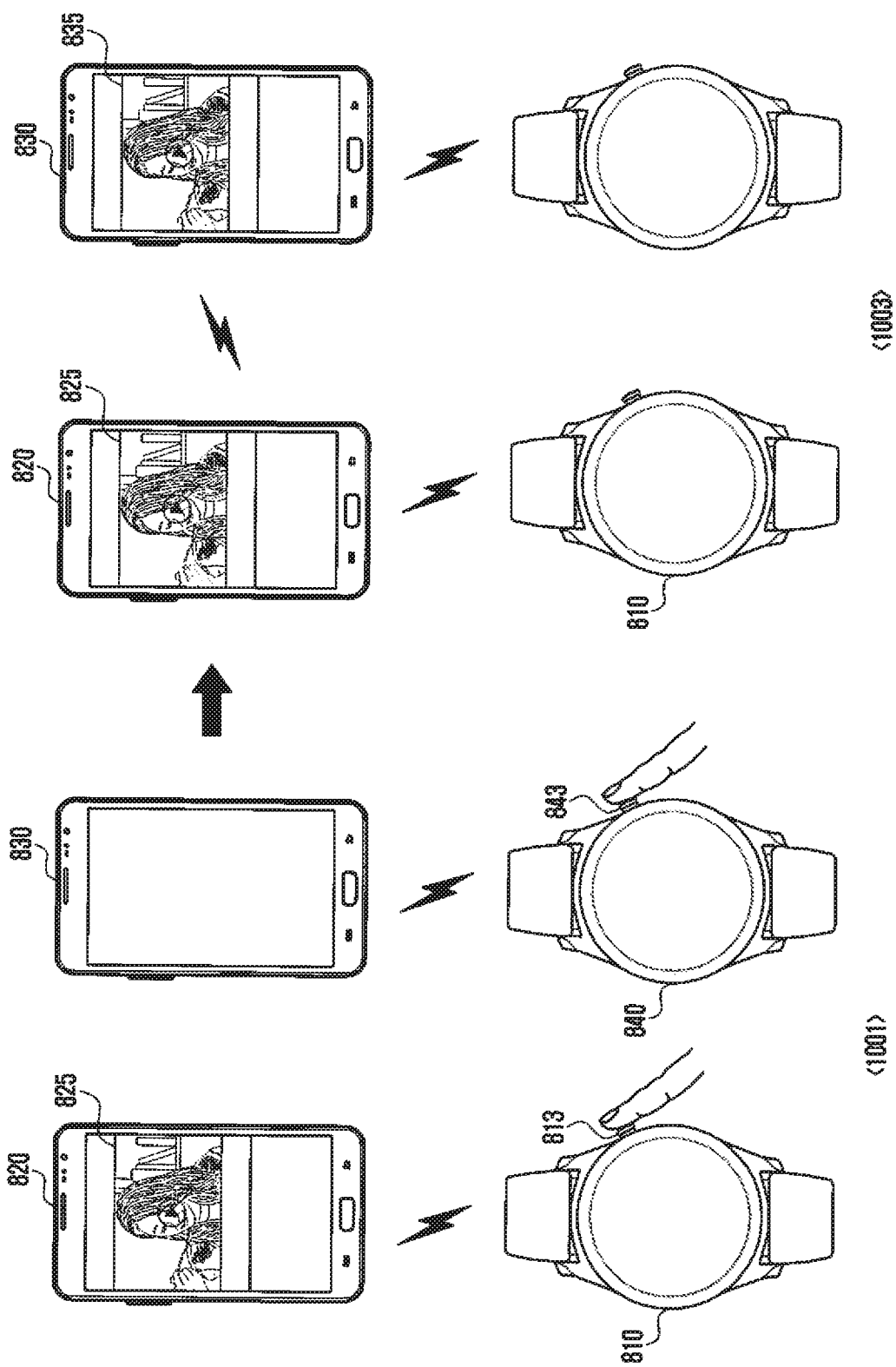
FIG. 10 is a diagram illustrating performing a communication connection using a voice between electronic devices and thereafter performing a function corresponding to the voice according to various embodiments of the disclosure.

FIG. 10 is a diagram illustrating performing a communication connection using a voice between electronic devices and thereafter performing a function corresponding to the voice according to various embodiments of the disclosure. The same descriptions as those given above in FIGS. 8 and 9 will be omitted.

According to various embodiments, as indicated by reference numeral 1001, a user may input a voice (e.g., "send a video file") into the first and fourth electronic devices 810 and 840 while pressing keys 813 and 843 of the first and fourth electronic devices 810 and 840. Then, the first and fourth electronic devices 810 and 840 that receive the user voice may generate recorded data in which the user voice is recorded, and transmit the generated recorded data to the second and third electronic devices 820 and 830, respectively, which have been communication-connected. The second and third electronic devices 820 and 830 that receive the recorded data may recognize the meanings of "video file" and "send" included in the recorded data and identify a command for a function of sending a video file.

According to various embodiments, as indicated by reference numeral 1003, the second and third electronic devices 820 and 830 that receive the recorded data may perform a communication connection, based on data related to the user voice included in the recorded data. In addition, based on a command for a function included in the recorded data, the second and third electronic devices 820 and 830 may perform a video file transfer function after the communication connection.

In this case, a mode of the second electronic device 820 that is performing a function related to a video file 825 may be determined as a master mode, and a mode of the third electronic device 830 may be determined as a slave mode. Then, the second electronic device 820 determined to be in the master mode may transmit the video file 825 to the third electronic device 830 determined to be in the slave mode. Also, the third electronic device 830 being in the slave mode may perform a function related to the video file 825 received from the second electronic device 820.

Figure 11:
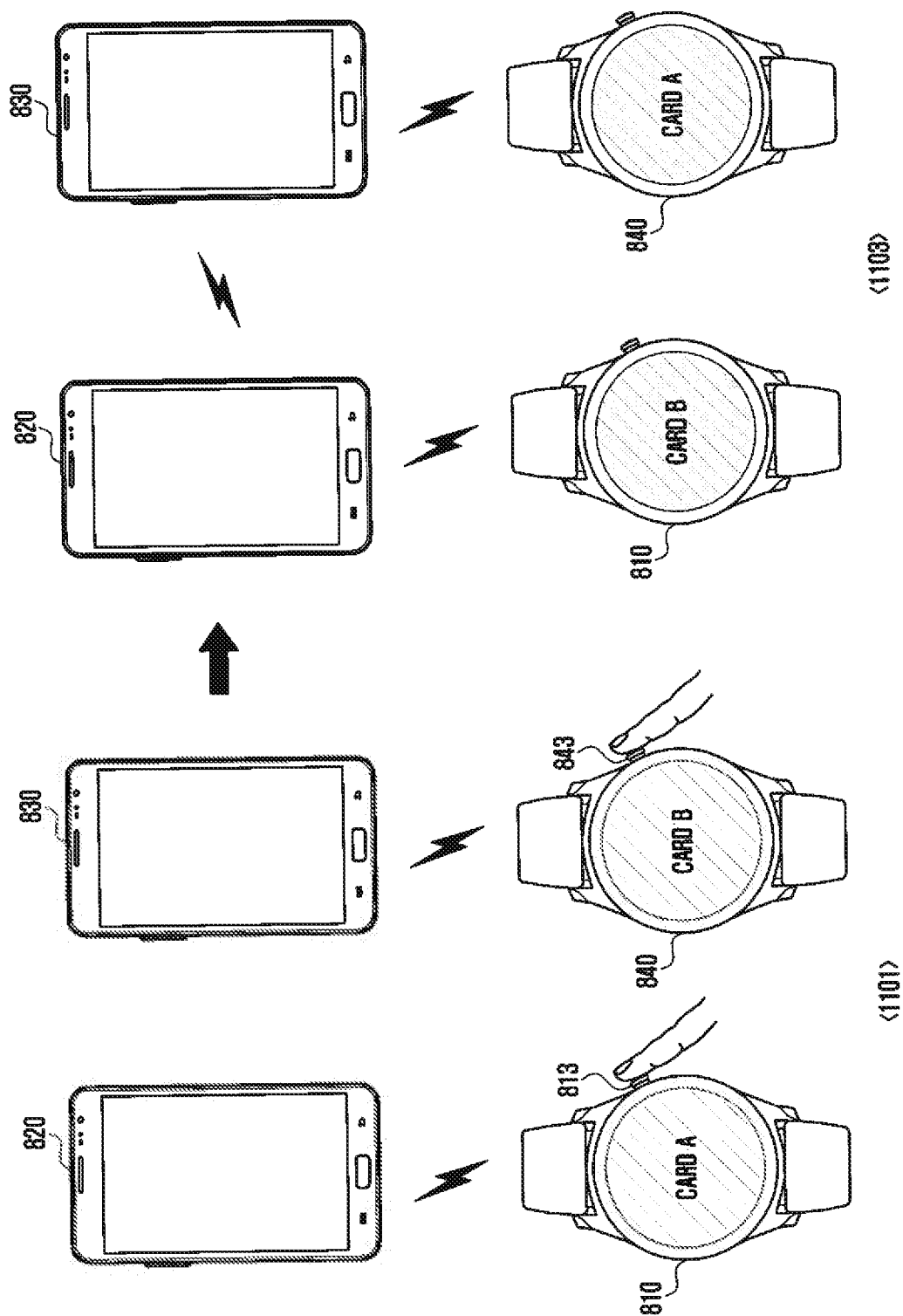
FIG. 11 is a diagram illustrating performing a communication connection using a voice between electronic devices and thereafter performing a function corresponding to the voice according to various embodiments of the disclosure.

FIG. 11 is a diagram illustrating performing a communication connection using a voice between electronic devices and thereafter performing a function corresponding to the voice according to various embodiments of the disclosure. The same descriptions as those given above in FIGS. 8 and 9 will be omitted.

According to various embodiments, as indicated by reference numeral 1101, a user may input a voice (e.g., "send a card file") into the first and fourth electronic devices 810 and 840 while pressing keys 813 and 843 of the first and fourth electronic devices 810 and 840. Then, the first and fourth electronic devices 810 and 840 that receive the user voice may generate recorded data in which the user voice is recorded, and transmit the generated recorded data to the second and third electronic devices 820 and 830, respectively. The second and third electronic devices 820 and 830 that receive the recorded data may recognize the meanings of "card file" and "send" included in the recorded data and identify a command for a function of sending a card file.

According to various embodiments, as indicated by reference numeral 1103, the second and third electronic devices 820 and 830 that receive the recorded data may perform a communication connection, based on data related to the user voice included in the recorded data. In addition, based on a command for a function included in the recorded data, the second and third electronic devices 820 and 830 may perform a card file transfer function after the communication connection. In this case, when the second and third electronic devices 820 and 830 is not displaying a card file, and when the first and fourth electronic devices 810 and 840 is displaying card files (e.g., card A, card B), the second and third electronic devices 820 and 830 may compare the waveform of a user voice extracted from the recorded data with the waveform of a preregistered user voice. For example, when the waveform of the user voice extracted from the recorded data is identical to the waveform of the preregistered user voice in the second electronic device 820 and is not identical to the waveform of the preregistered user voice in the third electronic device 830, the mode of the second electronic device 820 may be determined as a master mode, and the mode of the third electronic device 830 may be determined as a slave mode.

The second electronic device 820 determined as a master mode may request the first electronic device 810 to transmit a card file (e.g., card A), and then transmit the card file, received from the first electronic device 810, to the third electronic device 830 determined as a slave mode. Also, the third electronic device 830 that receives the card file (e.g., card A) from the second electronic device 820 may request the fourth electronic device 840 to transmit another card file (e.g., card B), and then transmit the card file, received from the fourth electronic device 840, to the second electronic device 820 determined as a master mode.

Figure 12:
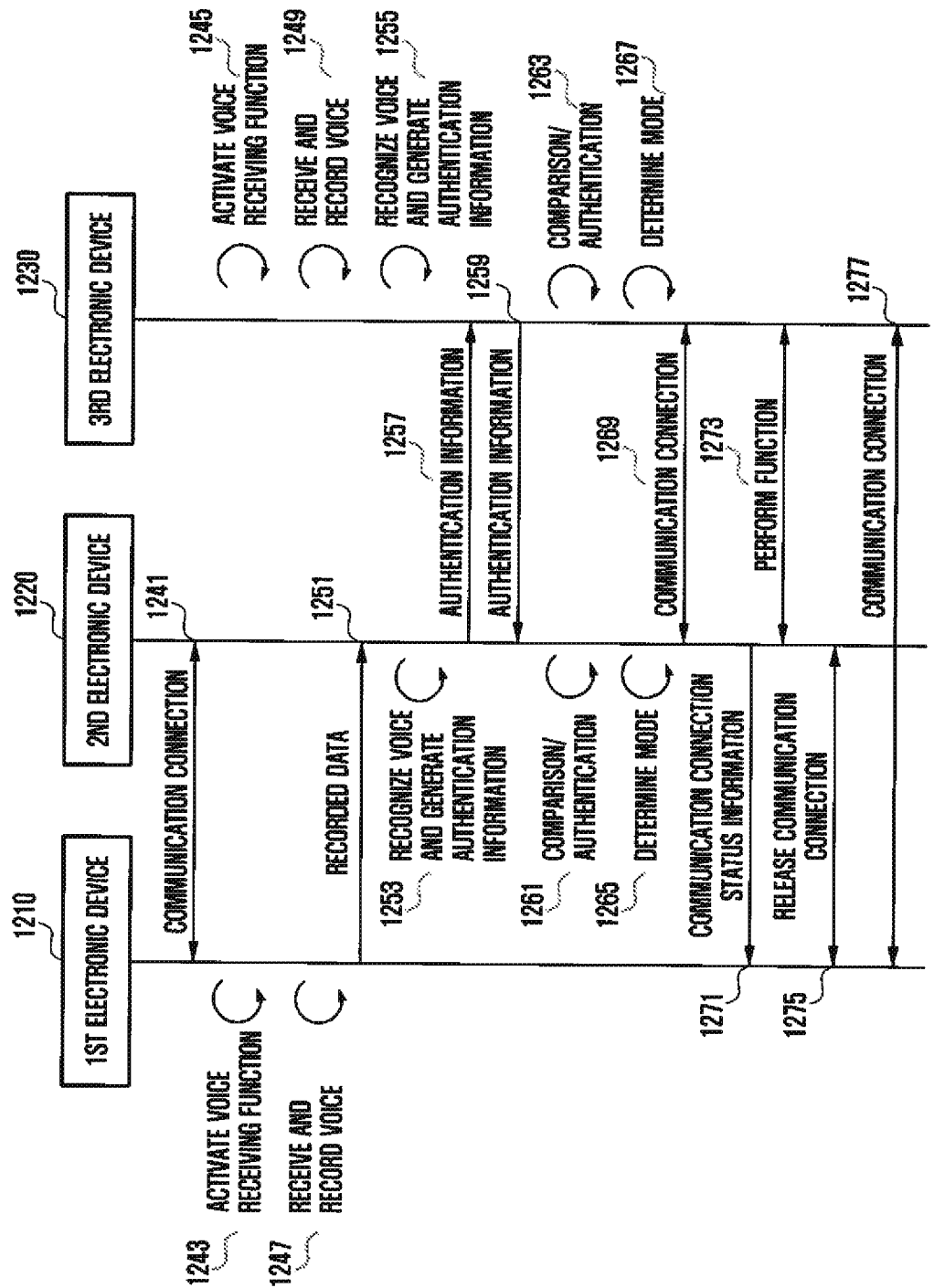
FIG. 12 is a flow diagram illustrating a communication connection using a voice between electronic devices according to various embodiments of the disclosure.

FIG. 12 is a flow diagram illustrating a communication connection using a voice between electronic devices according to various embodiments of the disclosure. According to various embodiments, each of a first electronic device 1210, a second electronic device 1220 and a third electronic device 1230 may include all or parts of the electronic device 101 shown in FIG. 1. The same descriptions as those given above in FIG. 8 will be omitted.

According to various embodiments, at operation 1241, the first electronic device 1210 may be communication-connected to the second electronic device 1220.

According to various embodiments, at operations 1243 and 1245, the first and third electronic devices 1210 and 1230 may activate a voice receiving function when receiving a user input of pressing a key.

According to various embodiments, at operations 1247 and 1249, the first and third electronic devices 1210 and 1230 may receive a user voice by activating a microphone and generate recorded data in which the user voice received through the microphone is recorded. For example, the user may input a voice including "newly connect another smart phone" in the first and third electronic devices 1210 and 1230 while manually pressing the keys of the first and third electronic devices 1210 and 1230. Then, when the user detaches the finger from the keys after the voice input is completed, the user input of pressing the keys may be released. In addition, when the user voice is inputted through the microphone while the user input of pressing the keys is received, the first and third electronic devices 1210 and 1230 may generate the recoded data including data on a time related to recording the user input (e.g., a time point when the recording of the user voice starts or ends).

According to various embodiments, at operation 1251, when the user input of pressing the key is released, the first electronic device 1210 may transmit the generated recorded data to the second electronic device 1220 which is communication-connected.

According to various embodiments, at operation 1253, the second electronic device 1220 may recognize the user voice included in the recorded data received from the first electronic device 1210, and extract data related to the user voice from the recorded data. For example, the second electronic device 1220 may extract data on the waveform of the user voice from the recorded data. For example, the second electronic device 1220 may determine whether a command related to a function is included in the recorded data. For example, when the user voice includes "newly connect another smart phone", the second electronic device 1220 may recognize the meanings of "another smart phone", "newly", and "connect", and then extract a command for a communication connection function.

According to various embodiments, at operation 1255, when the user input of pressing the key is released, the third electronic device 1230 may recognize the user voice included in the recorded data and extract data related to the user voice from the recorded data in the same or similar manner as or to that of the second electronic device 1220.

According to various embodiments, when a command for the communication connection function is extracted from the recorded data, the second and third electronic devices 1220 and 1230 may generate authentication data for the communication connection. For example, the second and third electronic devices 1220 and 1230 may generate authentication data composed of letters, numbers, or a combination thereof in accordance with a predetermined rule, based on at least one of data on time related to recording of a user voice, the number of words and syllables included in the user voice, and data on the waveform of the user voice. For example, each of the second and third electronic devices 1220 and 1230 may generate authentication data including identification data (e.g., a device address).

According to various embodiments, at operations 1257 and 1259, the second and third electronic devices 1220 and 1230 may transmit the generated authentication data to the outside via the communication module, and receive authentication data transmitted by other electronic device.

According to various embodiments, at operations 1261 and 1263, the second and third electronic devices 1220 and 1230 may determine whether the received authentication data of other electronic device is data for performing the communication connection function, and further determine whether that electronic device is a target electronic device of communication connection. For example, each of the second and third electronic devices 1220 and 1230 may compare the received authentication data of other electronic device with authentication data generated by itself to determine whether the time related to recording of a user voice is identical, whether the number of words and syllables included in the user voice is identical, and/or whether the waveform of the user voice is identical.

According to various embodiments, at operations 1265 and 1267, the second and third electronic devices 1220 and 1230 may determine a mode, based on the recorded data. For example, when the second and third electronic devices 1220 and 1230 extract words (e.g., "another smart phone", "newly", "connect") included in the user voice from the recorded data while the first and second electronic devices 1210 and 1220 are communication-connected to each other, the second electronic device 1220 may be determined to be in a master mode, and the third electronic device 1230 may be determined to be in a slave mode.

According to various embodiments, at operation 1269, the second and third electronic devices 1220 and 1230 may perform a communication connection with a target device of the communication connection. For example, when the received authentication data includes a device address, the second and third electronic devices 1220 and 1230 may perform the communication connection with each other by using the device address thereof included in the received authentication data.

According to various embodiments, when the communication connection is performed with the target electronic device, the second electronic device 1220 may transmit, at operation 1271, data on a communication connection status to the first electronic device 1210 which has been communication-connected.

According to various embodiments, when the communication connection is performed with the target electronic device, each of the second and third electronic devices 1220 and 1230 may perform, at operation 1273, a function to be performed after the communication connection, based on the mode thereof. For example, when the recorded data includes a command for a function of a new communication connection, the second electronic device 1220 determined to be in a master mode may transmit stored data (e.g., data for a device address, data related to a healthcare application, an image file, a music file) on the first electronic device 1210, which has been communication-connected, to the third electronic device 1230.

According to various embodiments, when the function included in the user voice and to be performed after the communication connection is performed completely, the second and third electronic devices 1220 and 1230 may automatically release the communication connection with the counterpart electronic device.

According to various embodiments, the second electronic device 1220 may transmit data on the device address of the third electronic device 1230 to the first electronic device 1210 at operation 1271, and when the transmission of the data on the device address is completed, release the communication connection with the first electronic device 1210.

According to various embodiments, at operation 1227, the first and third electronic devices 1210 and 1230 may perform a communication connection by using the device address for the counterpart electronic device received from the second electronic device 1220.

Figure 13A:
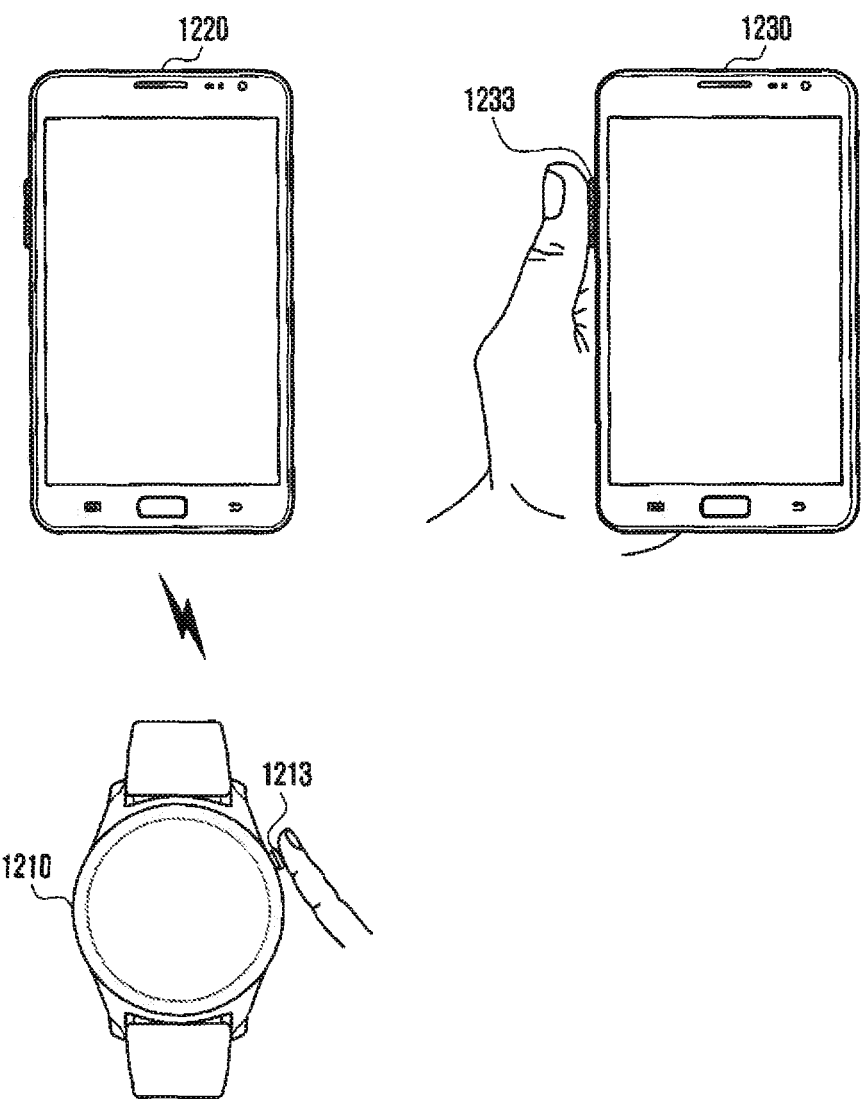
FIGS. 13A, 13B and 13C are diagrams illustrating performing a communication connection using a voice between electronic devices and thereafter performing a function corresponding to the voice according to various embodiments of the disclosure.
Figure 13B:
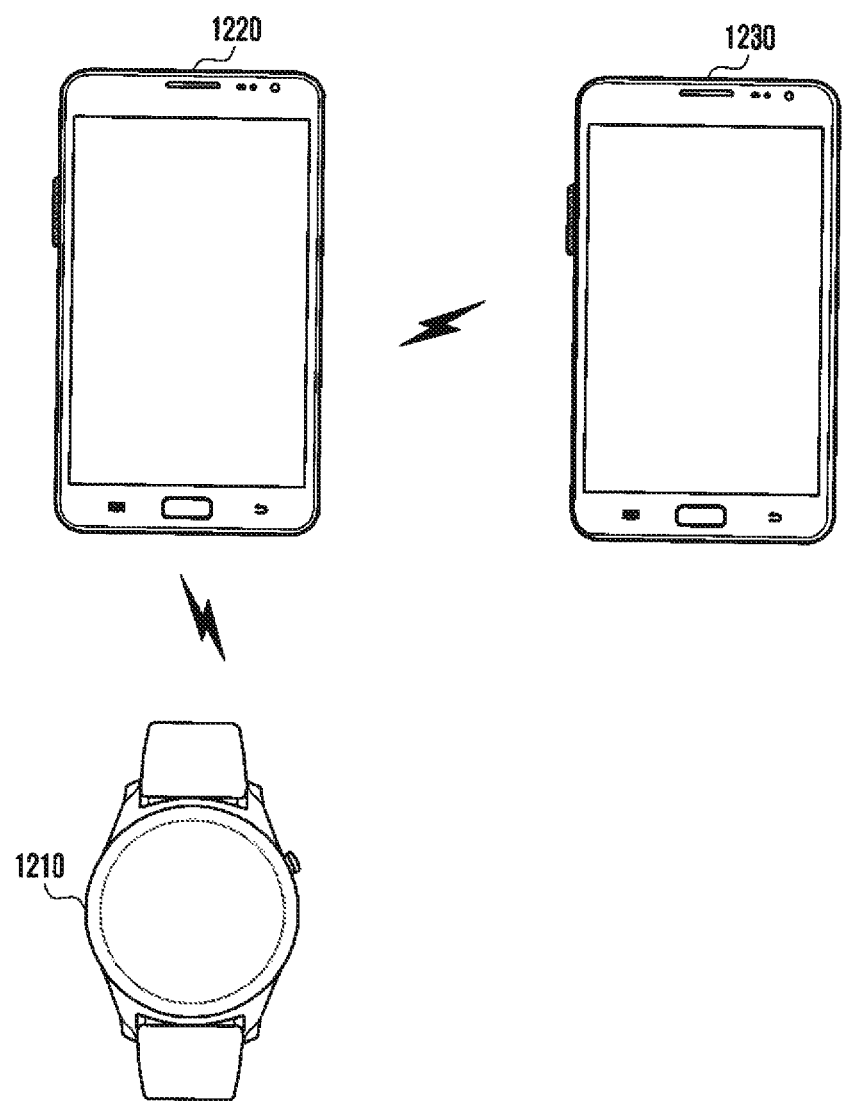
Figure 13C:
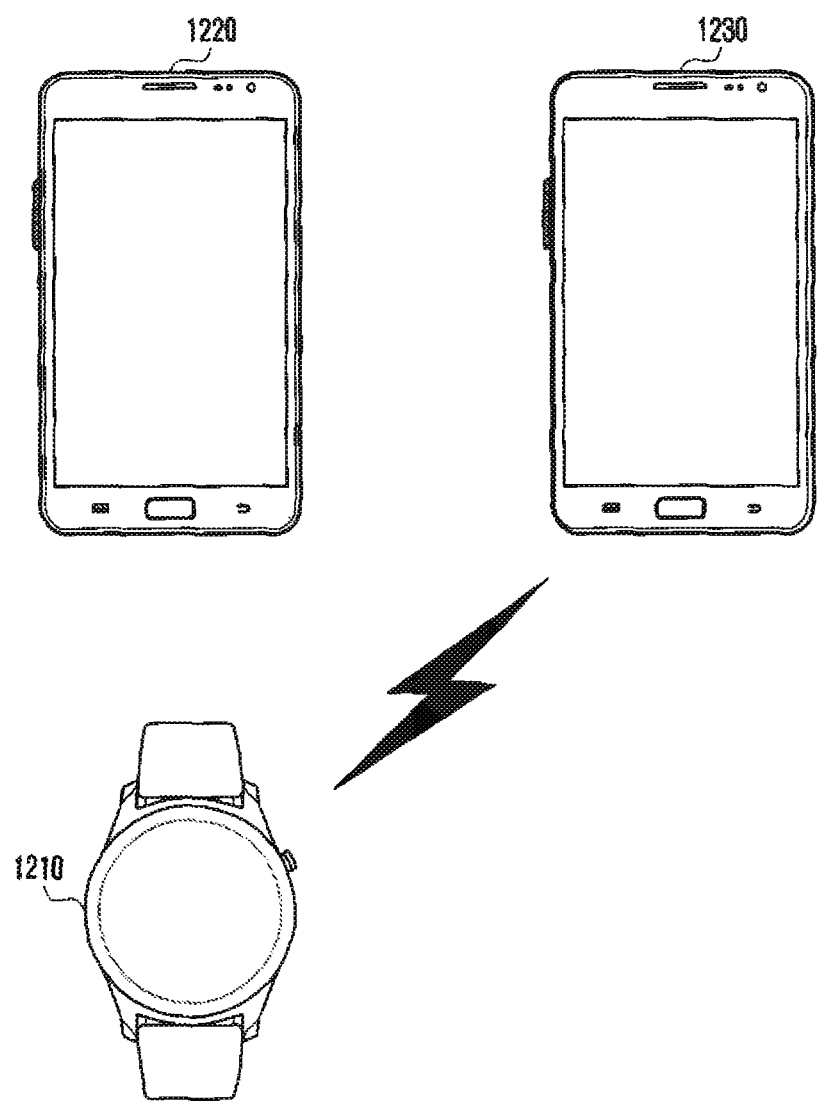

FIGS. 13A, 13B and 13C are diagrams illustrating performing a communication connection using a voice between electronic devices and thereafter performing a function corresponding to the voice according to various embodiments of the disclosure. The same descriptions as those given above in FIG. 12 will be omitted.

According to various embodiments, as shown in FIG. 13A, a user may input a voice (e.g., "newly connect another smart phone") into the first and third electronic devices 1210 and 1230 while pressing keys 1213 and 1233 of the first and third electronic devices 1210 and 1230. Then, the first and third electronic devices 1210 and 1230 that receive the user voice may generate recorded data in which the user voice is recorded. In addition, the first electronic device 1210 may transmit the generated recorded data to the second electronic device 1220 which has been communication-connected. The second and third electronic devices 1220 and 1230 may recognize the meanings of "another smart phone", "newly", and "connect" included in the recorded data and identify a command for a communication connection function.

According to various embodiments, as shown in FIG. 13B, the second and third electronic devices 1220 and 1230 may perform a communication connection, based on data related to the user voice included in the recorded data. In addition, based on a command for a function included in the recorded data, the second and third electronic devices 1220 and 1230 may perform a function after the communication connection. In this case, when the second and third electronic devices 1220 and 1230 extract words (e.g., "another smart phone", "newly", "connect") included in the user voice from the recorded data while the first and second electronic devices 1210 and 1220 are communication-connected to each other, the second electronic device 1220 may be determined to be in a master mode, and the third electronic device 1230 may be determined to be in a slave mode. In addition, the second electronic device 1220 determined to be in a master mode may transmit stored data (e.g., data for a device address, data related to a healthcare application, an image file, a music file) on the first electronic device 1210, which has been communication-connected, to the third electronic device 1230. Also, the second electronic device 1220 may transmit data on the device address of the third electronic device 1230 to the first electronic device 1210.

According to various embodiments, as shown in FIG. 13C, when the data on the device address of the third electronic device 1230 is completely transmitted to the first electronic device 1210, the second electronic device 1220 may release the communication connection with the first electronic device 1210. The first and third electronic devices 1210 and 1230 may perform a communication connection by using the device address for the counterpart electronic device received from the second electronic device 1220.

While the disclosure has been described in detail with reference to specific embodiments, it is to be understood that various changes and modifications may be made without departing from the scope of the disclosure. Therefore, the scope of the disclosure should not be limited by embodiments described herein, but should be determined by the scope of the appended claims and equivalents thereof.

The invention claimed is:

1. An electronic device comprising:
a microphone;
a communication module;
a memory; and
at least one processor,
wherein the processor is configured to:
  receive and record a voice through the microphone while a function of receiving the voice is activated,
  generate first authentication data including data regarding the voice and identification data regarding the electronic device, based on the recorded voice,
  determine a mode of the electronic device, based on the recorded voice,
  transmit the first authentication data to at least one external electronic device,
  receive at least one second authentication data corresponding to the first authentication data from at least one external electronic device,
  select an external electronic device among the at least one external electronic device based on whether the external electronic device transmits the second authentication data including data identical to the data regarding the voice included in the first authentication data,
  control the communication module to connect between the electronic device and the selected external electronic device, and
  perform at least one function related to the voice with the communication-connected external electronic device according to the mode.

2. The electronic device of claim 1, wherein the processor is further configured to generate the data on the voice including data composed of letters, numbers, or a combination thereof, based on at least one of data related to a recording time of the voice, a word included in the voice, and a number of syllables included in the voice.

3. The electronic device of claim 1, wherein the processor is further configured to extract, from the recorded voice, a command for at least one of the communication connection and at least one function to be performed after the communication connection.

4. The electronic device of claim 1, wherein the processor is further configured to determine the mode, based on whether a function related to a word included in the voice has been performed in the electronic device before the function of receiving the voice is activated, or whether the recorded voice is identical to a user voice previously stored in the memory.

5. An electronic device comprising:
a communication module;
a memory; and
at least one processor,
wherein the processor is configured to:
  receive a recorded voice from a first external electronic device communication-connected through the communication module,
  generate first authentication data including data regarding the voice and identification data regarding the electronic device, based on the recorded voice,
  determine a mode of the electronic device, based on the recorded voice,
  transmit the first authentication data to at least one external electronic device,
  receive at least one second authentication data corresponding to the first authentication data from at least one external electronic device,
  select an external electronic device among the at least one external electronic device based on whether the external electronic device transmits the second authentication data including data identical to the data regarding the voice included in the first authentication data,
  control the communication module to connect between the electronic device and the selected external electronic device, and
  perform at least one function related to the recorded voice with the communication-connected second external electronic device according to the mode.

6. The electronic device of claim 5, wherein the processor is further configured to request the first external electronic device to transmit data to be transmitted to the communication-connected second external electronic device, and to transmit the data, received from the first external electronic device, to the second external electronic device.

7. The electronic device of claim 5, wherein the processor is further configured to generate the data on the voice including data composed of letters, numbers, or a combination thereof, based on at least one of data related to a recording time of the voice, a word included in the voice, and a number of syllables included in the voice.

8. The electronic device of claim 5, wherein the processor is further configured to extract, from the recorded voice, a command for at least one of the communication connection with the second external electronic device and at least one function to be performed after the communication connection with the second external electronic device.

9. The electronic device of claim 5, wherein the processor is further configured to determine the mode, based on whether a function related to a word included in the recorded voice has been performed in the electronic device before data including the recorded voice is received from the first external electronic device, or whether the recorded voice is identical to a user voice previously stored in the memory.

10. The electronic device of claim 5, wherein the processor is further configured to request the first external electronic device to inform a function being performed in the first external electronic device, and to determine the mode, based on whether a function related to a word included in the recorded voice has been performed in the first external electronic device, or whether the recorded voice is identical to a user voice previously stored in the memory.

11. A communication connection method of an electronic device using a voice, the method comprising operations of:
receiving and recording a voice through a microphone while a function of receiving the voice is activated;
generating first authentication data including data regarding the voice and identification data regarding the electronic device, based on the recorded voice;
determining a mode of the electronic device, based on the recorded voice;
transmitting the first authentication data to at least one external electronic device;
receiving at least one second authentication data corresponding to the first authentication data from the at least one external electronic device;
selecting an external electronic device among the at least one external electronic device based on whether the external electronic device transmits the second authentication data including data identical to the data regarding the voice included in the first authentication data;
controlling the communication module to connect between the electronic device and the selected external electronic device, and
performing at least one function related to the voice with the communication-connected external electronic device according to the mode.

12. The method of claim 11, wherein the data on the voice includes data composed of letters, numbers, or a combination thereof, based on at least one of data related to a recording time of the voice, a word included in the voice, and a number of syllables included in the voice.

13. The method of claim 11, further comprising operation of:
extracting, from the recorded voice, a command for at least one of the communication connection and at least one function to be performed after the communication connection.

14. The method of claim 11, wherein the mode is determined, based on whether a function related to a word included in the voice has been performed in the electronic device before the function of receiving the voice is activated, or whether the recorded voice is identical to a user voice previously stored in the memory.

* * * * *